US010967501B1

(12) United States Patent
Linnell et al.

(10) Patent No.: US 10,967,501 B1
(45) Date of Patent: Apr. 6, 2021

(54) GUIDE PLACEMENT BY A ROBOTIC DEVICE

(71) Applicant: X Development LLC, Mountain View, CA (US)

(72) Inventors: Jeff Linnell, Woodside, CA (US); Marek Michalowski, San Francisco, CA (US); Kendra Byrne, Mountain View, CA (US); Brandon Kruysman, San Francisco, CA (US); Eli Reekmans, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 269 days.

(21) Appl. No.: 16/182,733

(22) Filed: Nov. 7, 2018

Related U.S. Application Data

(62) Division of application No. 15/221,555, filed on Jul. 27, 2016, now Pat. No. 10,150,213.

(51) Int. Cl.
*B25J 9/00* (2006.01)
*B25J 9/16* (2006.01)
*B25J 15/00* (2006.01)

(52) U.S. Cl.
CPC ........... *B25J 9/0084* (2013.01); *B25J 9/1679* (2013.01); *B25J 9/1687* (2013.01); *B25J 15/0028* (2013.01); *B25J 9/009* (2013.01); *B25J 9/0096* (2013.01); *G05B 2219/50151* (2013.01)

(58) Field of Classification Search
CPC ...... B25J 9/0084; B25J 9/1679; B25J 9/1687; B25J 15/0028; B25J 15/0033; B25J 9/009; B25J 9/0096; G05B 2219/50151
See application file for complete search history.

(56) References Cited

U.S. PATENT DOCUMENTS

| 4,894,901 | A |   | 1/1990  | Soderberg |           |
|-----------|---|---|---------|-----------|-----------|
| 5,265,317 | A | * | 11/1993 | Angel     | B23P 21/00 |
|           |   |   |         |           | 228/212   |
| 7,331,094 | B2|   | 2/2008  | Berninber |           |
| 7,729,796 | B2|   | 6/2010  | Hartrampf et al. | |
| 8,431,858 | B2| * | 4/2013  | Kanaya    | B23K 11/093 |
|           |   |   |         |           | 219/104   |

(Continued)

FOREIGN PATENT DOCUMENTS

| DE | 102004012592 | 3/2006  |
|----|--------------|---------|
| DE | 102004049332 | 4/2006  |
| EP | 2537642      | 12/2012 |

*Primary Examiner* — Jason Holloway

(74) *Attorney, Agent, or Firm* — Fish & Richardson P.C.

(57) ABSTRACT

Example implementations may relate to providing a dynamic jig in a three-dimensional (3D) coordinate system. Specifically, a control system may (i) receive task data specifying a manipulation of one or more parts at a specified location; (ii) determine: (a) one or more work surfaces and (b) a first position of each of the one or more work surfaces, such that the one or more work surfaces collectively provide a jig to facilitate the specified manipulation of the parts; (iii) a plurality of guide end effectors that are positionable by one or more robotic devices such that the end effectors provide the work surfaces at the respectively determined first positions; and (iv) operate the one or more robotic devices to position the guide end effectors to provide the one or more work surfaces at the respectively determined first positions, thereby forming the jig from the one or more work surfaces.

20 Claims, 18 Drawing Sheets

(56) References Cited

U.S. PATENT DOCUMENTS

| | | | |
|---|---|---|---|
| 2004/0009258 A1* | 1/2004 | Romanski | B29C 45/7207 425/533 |
| 2005/0021170 A1 | 1/2005 | Gustafsson et al. | |
| 2008/0235970 A1* | 10/2008 | Crampton | B25J 13/088 33/503 |
| 2008/0319557 A1* | 12/2008 | Summers | G05B 19/4015 700/19 |
| 2014/0061283 A1* | 3/2014 | Shoji | B23K 20/1245 228/2.1 |
| 2014/0277715 A1* | 9/2014 | Nagai | B25J 21/00 700/248 |
| 2016/0059419 A1* | 3/2016 | Suzuki | B25J 9/1697 700/114 |
| 2016/0306340 A1* | 10/2016 | Nammoto | G05B 19/402 |

* cited by examiner

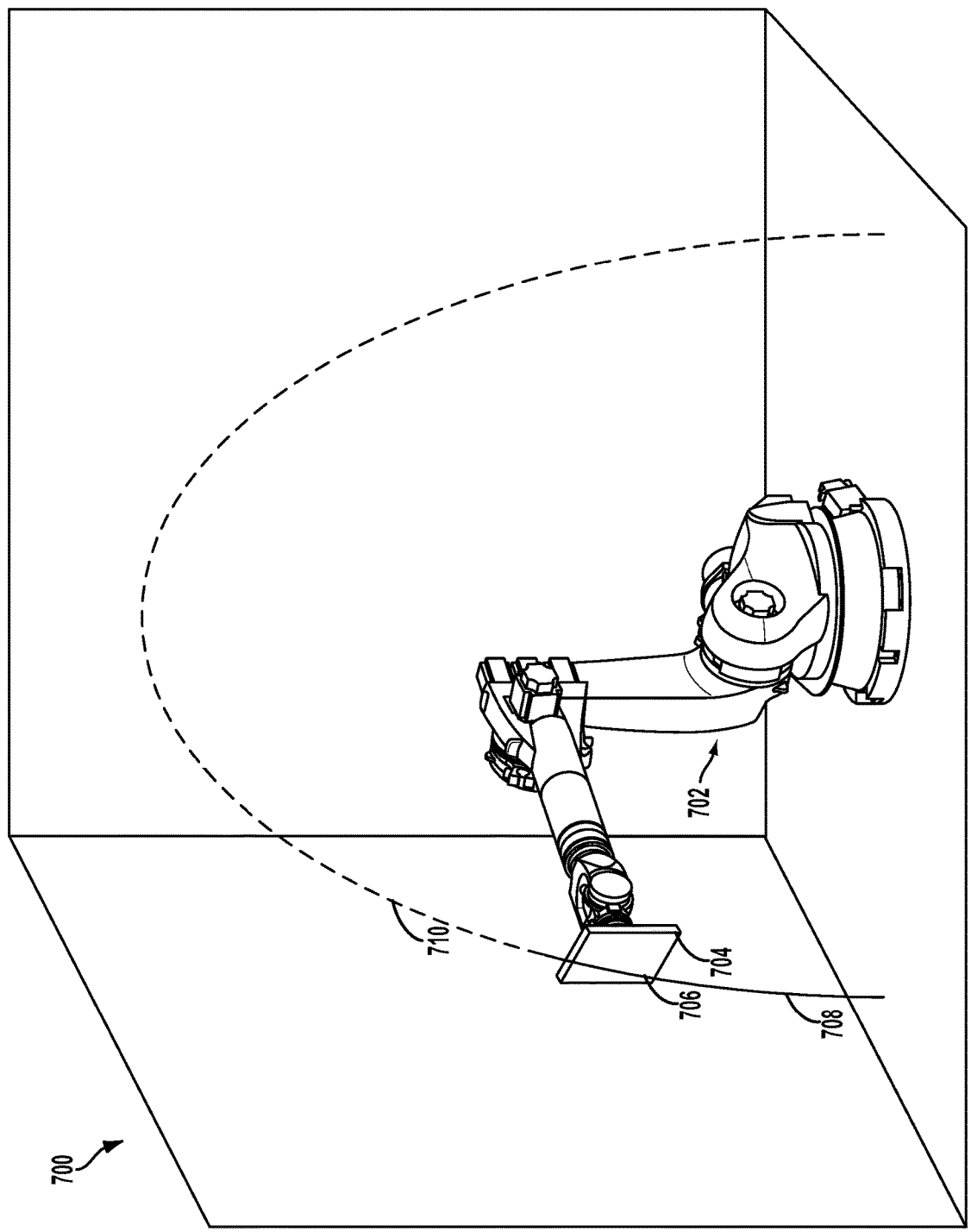

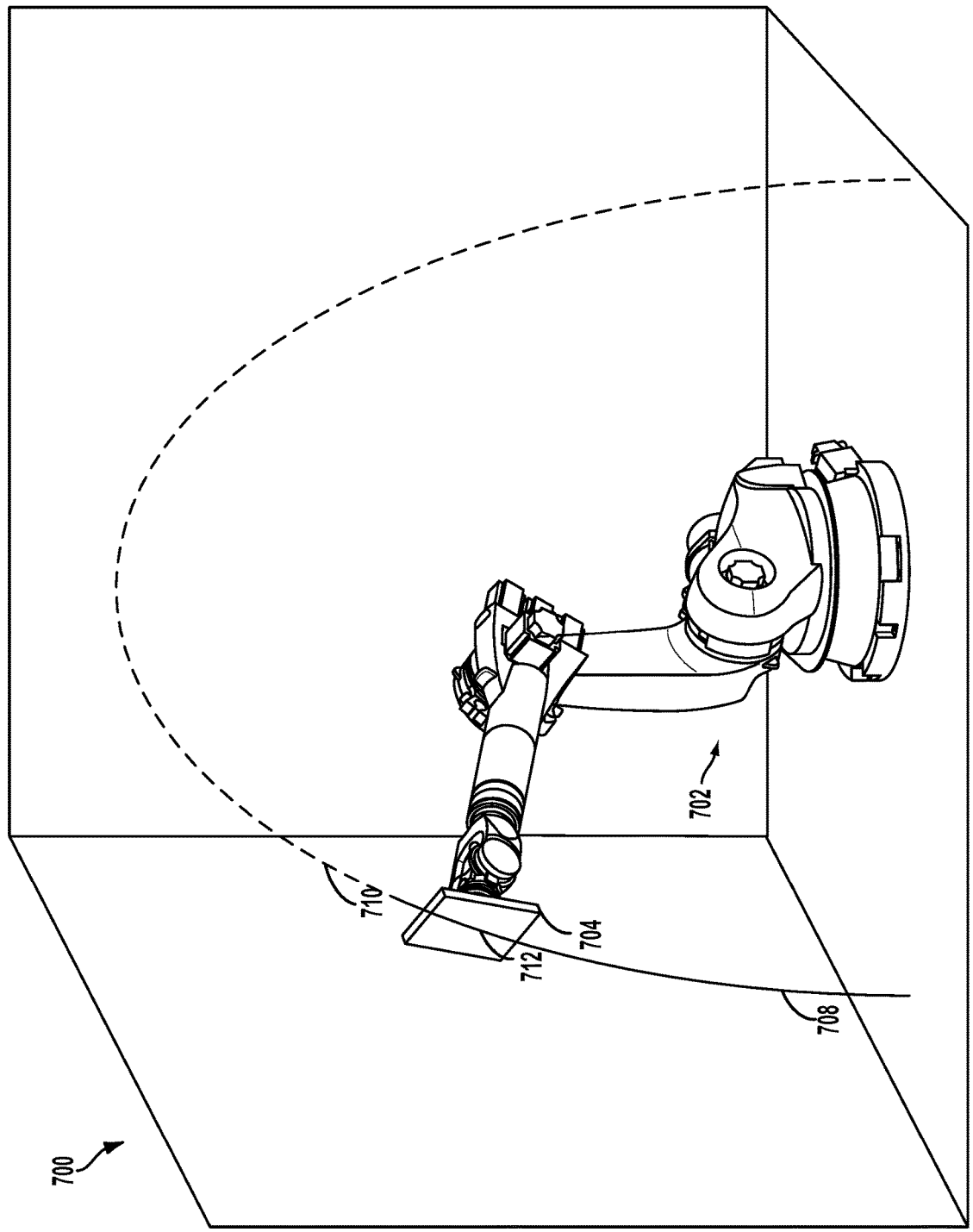

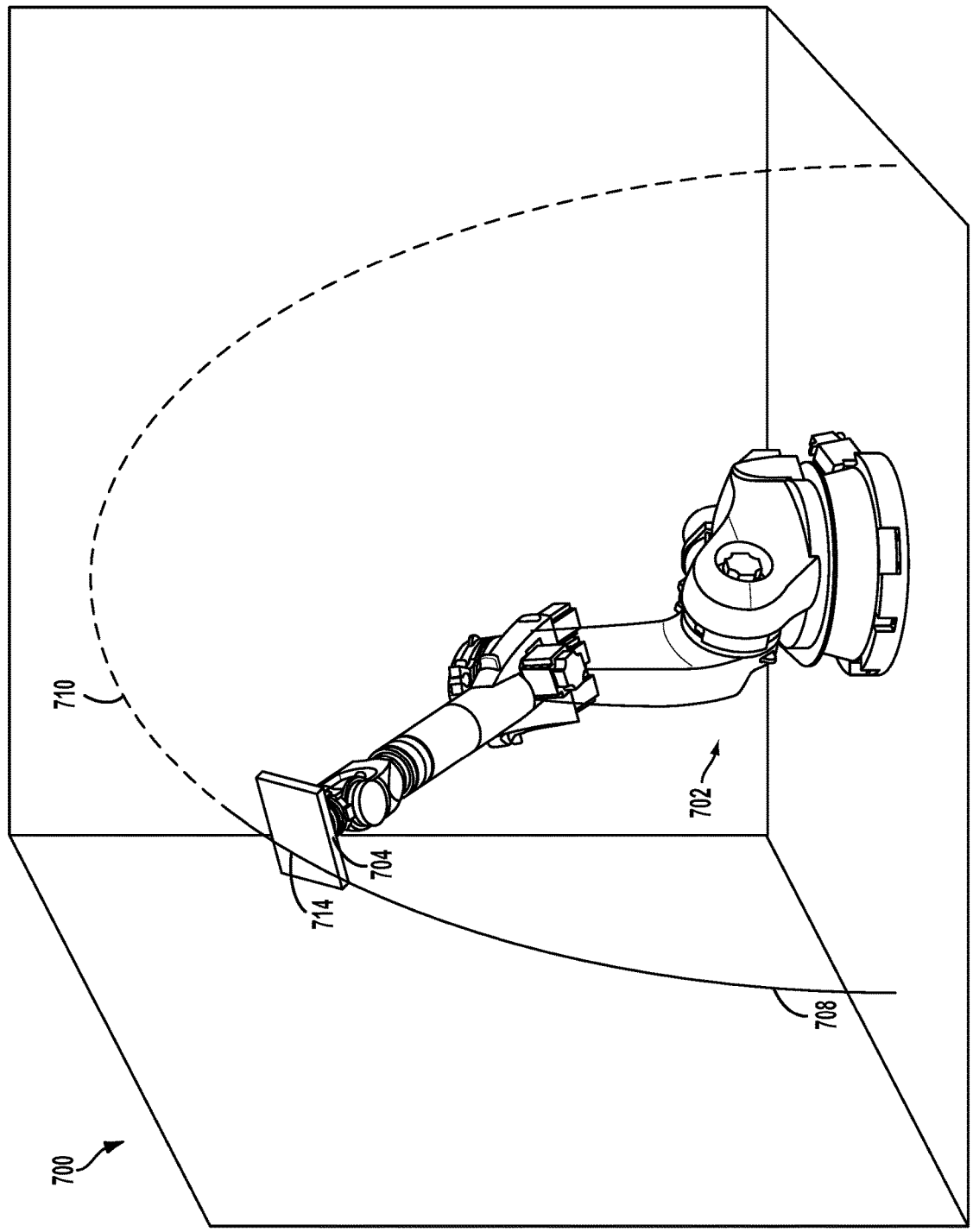

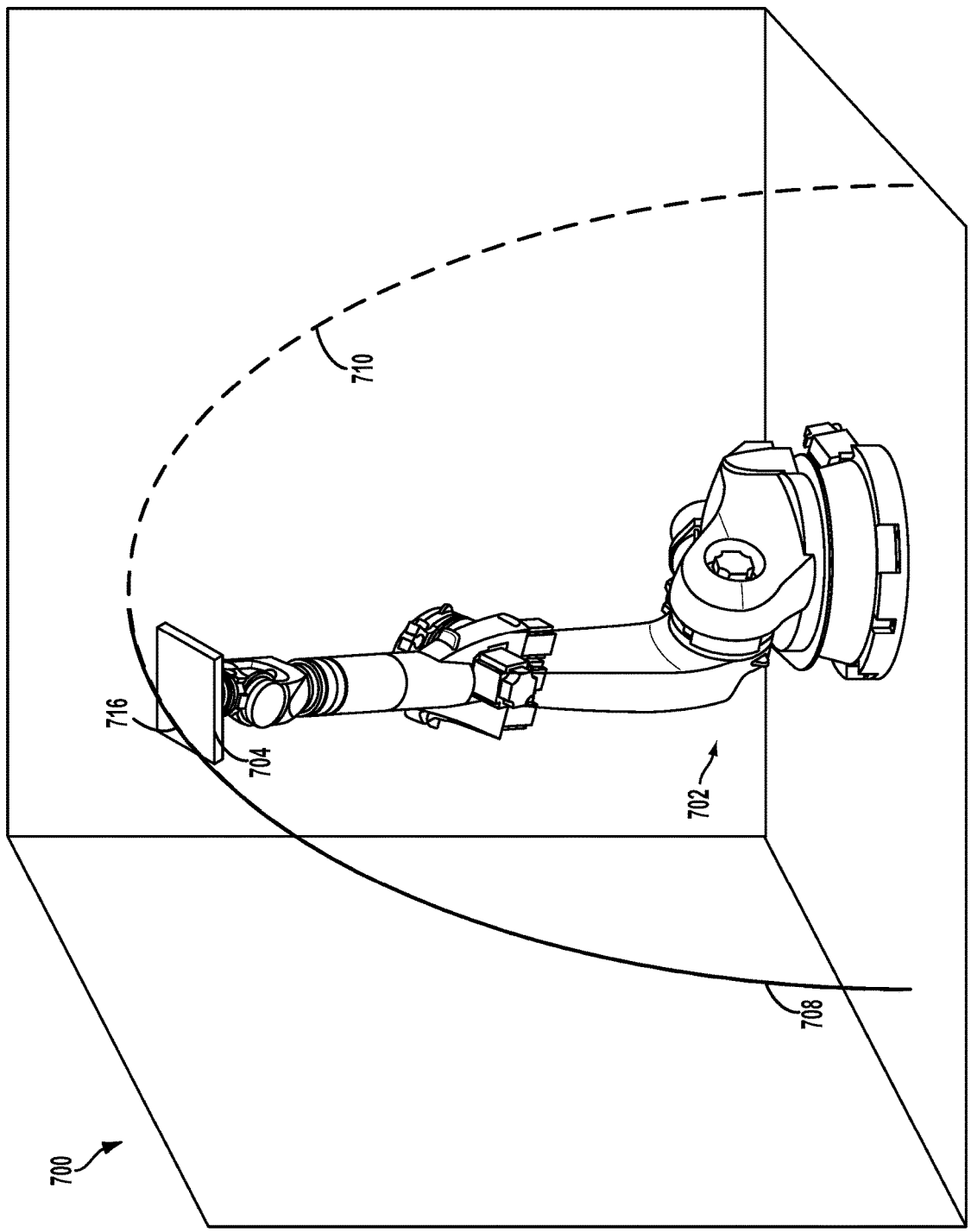

GUIDE PLACEMENT BY A ROBOTIC DEVICE

CROSS-REFERENCE TO RELATED APPLICATION

This application is a divisional of U.S. application Ser. No. 15/221,555, filed Jul. 27, 2016, the contents of which are herein incorporated by reference.

BACKGROUND

Unless otherwise indicated herein, the materials described in this section are not prior art to the claims in this application and are not admitted to be prior art by inclusion in this section.

Automated construction or manufacturing processes may involve the use of one or more robotic devices that may be used to construct an output product, such as a car, a wall, a piece of furniture, or any number of other physical fabrications. The robotic devices may be equipped with end-effector-mounted tools, such as a gripper or a drill, that may be used during a construction process. The robotic devices may be programmed with sequences of specific motion commands and commands for other operations in order to cause the robotic devices to complete the construction process.

SUMMARY

Example implementations may relate to a control system that is programmatically arranged to control one or more robotic devices to position one or more guide end effectors in three-dimensional (3D) space such that the one or more guide end effectors form a dynamic three-dimensionally oriented jig. The jig may provide at least one work surface against which one or more parts may be manipulated by workers that are performing a task. A jig formed by the one or more guide end effectors can also serve as a registration point for robotic devices that are performing a task that includes precisely positioning a plurality of parts proximate to one another. The control system may also operate the robotic devices to reconfigure and reposition the guide end effectors in 3D space as necessitated by the assigned task. For example, an assigned task may be computationally broken down into sequential task steps, and the control system may reposition and/or reconfigure the guide end effectors to form a respective jig for each task step.

In one aspect, a method is provided. The method involves receiving, by a control system, task data specifying a manipulation of one or more parts at a specified location within a three-dimensional (3D) coordinate system. The method also involves, based on the task data, the control system determining: (a) one or more work surfaces and (b) a first position of each of the one or more work surfaces in the 3D coordinate system, such that the one or more work surfaces collectively provide a jig to facilitate the specified manipulation of the one or more parts at the specified location in the 3D coordinate system. The method additionally involves selecting, by the control system, a plurality of guide end effectors that are positionable by one or more first robotic devices such that the end effectors provide the one or more work surfaces at the respectively determined first positions in the 3D coordinate system. The method further involves operating the one or more first robotic devices to position the guide end effectors so as to provide the one or more work surfaces at the respectively determined first positions, thereby forming the jig from the one or more work surfaces at the specified location in the 3D coordinate system.

In another aspect, a control system is provided. The control system includes one or more processors, a non-transitory computer readable medium, and program instructions stored on the non-transitory computer readable medium and executable by the one or more processors to receive task data specifying a manipulation of one or more parts at a specified location within a three-dimensional (3D) coordinate system. The program instructions are also executable to, based on the task data, determine: (a) at least one work surface and (b) a position of the at least one work surface in the 3D coordinate system, which collectively provide a jig to facilitate the specified manipulation of the one or more parts at the specified location in the 3D coordinate system. The program instructions are additionally executable to select, from a plurality of end effectors, one or more guide end effectors that are positionable by one or more first robotic devices, to form the at least one work surface at the determined position in the 3D coordinate system. The program instructions are further executable to operate the one or more first robotic devices to provide the jig at the determined position.

In yet another aspect, a system is provided. The system includes a plurality of robotic devices located in a worksite, a plurality of end effectors located in the worksite, and a control system configured to receive task data specifying a manipulation of one or more parts at a specified location within the worksite. The control system is also configured to, based on the task data, determine: (a) at least one work surface and (b) a position of the at least one work surface in the worksite, which collectively provide a jig to facilitate the specified manipulation of the one or more parts at the specified location in the worksite. The control system is further configured to select, from the plurality of end effectors, one or more guide end effectors that are positionable by one or more first robotic devices from the plurality of robotic devices, to form the at least one work surface at the determined position in the worksite. Yet further, the control system is configured to determine robot control data for operating the one or more first robotic devices to position the one or more guide end effectors to form the at least one work surface at the determined position in the worksite. The control system is additionally configured to operate the one or more first robotic devices to provide the jig at the determined position.

In yet another aspect, a method is provided. The method involves receiving, by a control system, task data specifying a manipulation of one or more parts at a specified location within a three-dimensional (3D) coordinate system. The method also involves, based on the task data, the control system determining: (a) at least one work surface and (b) a first position of the at least one work surface in the 3D coordinate system, which collectively provide a jig to facilitate the specified manipulation of the one or more parts at the specified location in the 3D coordinate system. The method additionally involves selecting, by the control system, from a plurality of end effectors, one or more guide end effectors that are positionable by one or more first robotic devices, to form the at least one work surface at the determined first position in the 3D coordinate system. The method further involves determining, by the control system, robot control data for operating the one or more first robotic devices to position the one or more guide end effectors to form the at least one work surface at the determined first position in the 3D coordinate system. The method yet further involves operating the one or more first robotic devices to provide the jig at the determined first position.

BRIEF DESCRIPTION OF THE DRAWINGS

FIGS. 7A, 7B, 7C, 7D, 7E depict a robotic device equipped with a planar end effector, according to an example embodiment.

DETAILED DESCRIPTION

Figure 1:
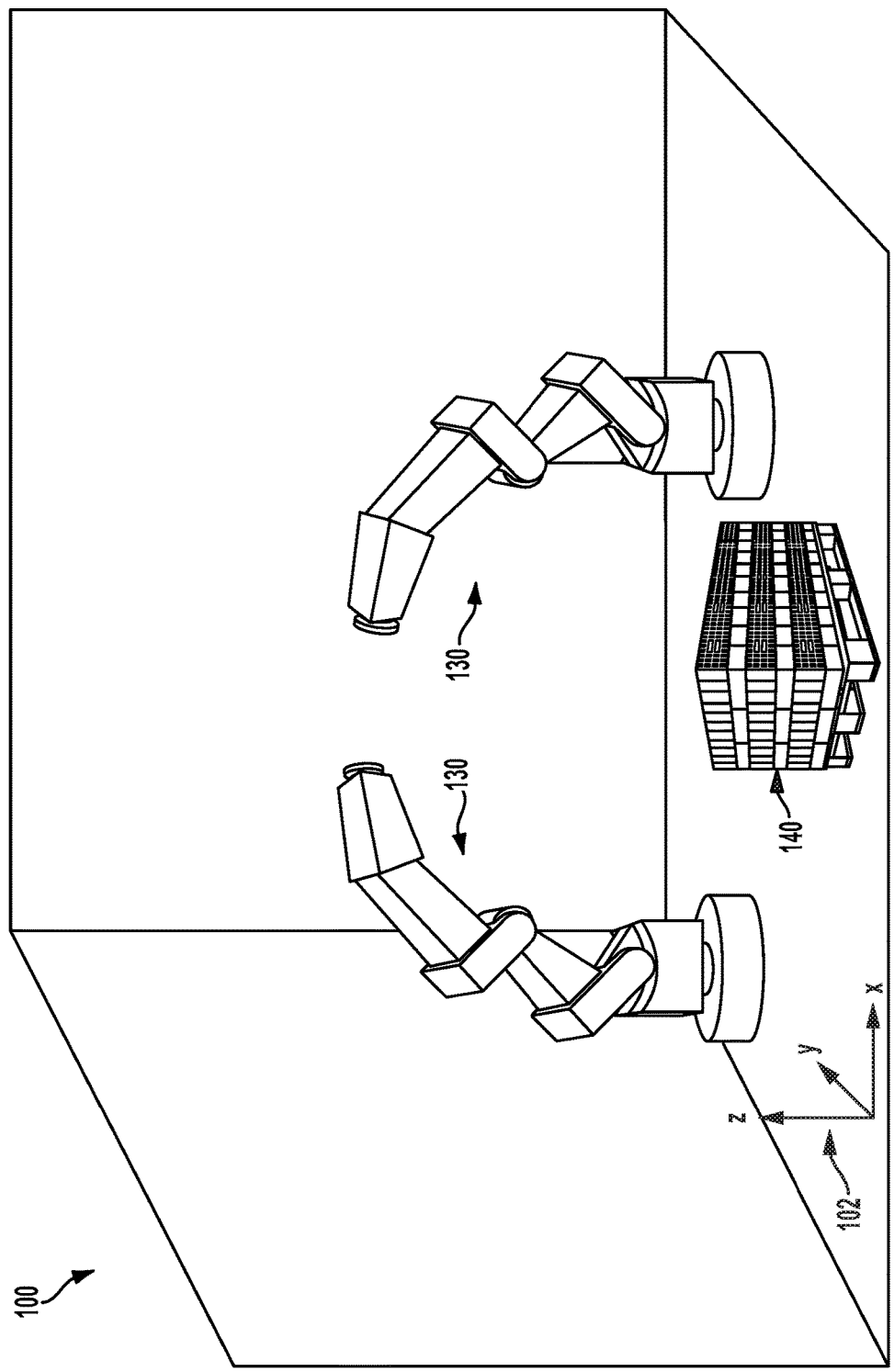
FIG. 1 depicts a worksite coordinate frame, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments include a system and methods that provide a dynamic three-dimensionally oriented jig in a worksite. More specifically, one or more robotic devices may provide a jig or a work surface in 3D space by arranging one or more guides in a particular configuration. Further, the robotic devices may position the jig at a specific location in the worksite such that the jig can serve as a guide to a tool (operated by a robotic worker and/or a human worker) to manipulate a part (that is positioned against the jig) in a specific manner. The robotic devices in a worksite may be operated by a central control system, which may provide instructions to the robotic devices based on a task that the control system may be assigned.

In an embodiment, the guides that the robotic devices may use to form a jig may be one or more end effectors that can be coupled to robotic devices. The guide end effectors may include a surface that can serve as a work surface against which a workpiece can be manipulated. Further, the surface included in each guide end effector may have a specific shape. For example, a guide end effector may be a planar guide end effector, a parabolic guide end effector, a convex guide end effector, or a concave guide end effector. In another example, a guide end effector may be a complementary end effector. A complementary end effector may have a shape that is an inverse of a workpiece (e.g., object or part) shape. Robotic devices can couple to different guide end effectors and can position the guide end effectors such that the surfaces of the guide end effectors form a jig or a work surface that can be used when manipulating a part during a construction process.

The configuration and the position of the jig may depend on a task that is assigned to a control system that operates robotic devices in the worksite. By way of example, the control system may receive task data (e.g., from a user), and the control system may operate the robotic devices in the worksite in order to perform the task specified by the task data. The task data may specify (i) a manipulation of one or more parts in the worksite, (ii) a location in the worksite at which to manipulate the one or more parts, and (iii) the tools that can be used to perform the specified manipulation. The control system may then analyze the task data to determine one or more work surfaces against which the one or more parts may be manipulated as specified by the task data. The control system may also determine the location at which to position the work surfaces such that the task may be performed at the location specified by the task data. The one or more work surfaces positioned at the determined location collectively make up a jig that can be used when performing the task.

The control system may then select one or more guide end effectors that can provide the determined work surface(s) at the specified location. Subsequently, the control system may cause one or more robotic devices to couple to the selected guide end effectors, and may cause the robotic devices to position the guide end effectors in 3D space such that the work surfaces are provided in the worksite at the determined location. A worker (e.g., a human or a robotic worker) may then use one or more tools to manipulate the one or more parts using the jig. For example, the one or more parts may be placed against the jig, and the shape of the jig may guide the tool to manipulate the part(s) in a specific manner.

Providing robotic devices that can serve as a jig forming apparatus may increase efficiency and automation in a worksite. For example, a dynamic jig can eliminate the need for multiple or custom jigs in the worksite since the dynamic jig can be repositioned and reconfigured in 3D space to provide a respective jig for each task that is assigned to the control system. As such, the dynamic jig can be used to construct a 3D structure in-situ at the worksite rather than manufacturing the parts of the structure in a factory and then assembling the structure at the worksite. Building a structure or object in-situ at a worksite may provide better customization of the design as the control system (or a designer) may take into account any existing features in the worksite when determining how to build the structure. Further, the design of the structure may be flexible to updates and redesigns. For example, when a design revision is made, the control system may operate robotic devices on-site to create the redesigned parts using the dynamic 3D jig rather than manufacturing the redesigned part at a factory, which may delay the construction process.

Furthermore, since a dynamic 3D jig can be reconfigured and repositioned, the control system can operate the robotic devices to position guide end effectors in order to form a work surface and/or jig for nearly any construction or manufacturing task. As such, a dynamic jig eliminates the need to design multiple custom jigs or work surfaces to build different parts of a structure. Rather, the dynamic jig can be repositioned and/or reconfigured in order to provide a work surface or jig to construct the different parts of an object or structure.

Within embodiments, a jig may be positioned in a worksite in order to geometrically align more than one part together. For example, the jig may be used to geometrically align one or more features of a plurality of parts, and the aligned features may be used to couple the plurality of parts by moving the aligned parts in a particular manner (e.g., sliding two aligned parts towards each other such that the aligned features of the parts couple together.) Some parts may require a specific joining process. For example, the parts may include features that interlock when meeting at a particular angle. A jig may be formed and positioned such that the jig may be used to align the features of the parts at the particular angle, and then the aligned parts may be moved in a particular manner such that the features interlock to couple the parts.

In another embodiment, a jig may be used to stabilize a structure as parts are added to the structure. As such, the formed jig may compensate for gravity, other environmental influences, or flexibility of the structure itself.

II. EXAMPLE SYSTEMS AND METHODS

A. Example Worksite Coordinate Frame

FIG. 1 depicts a worksite coordinate frame 100, according to an example embodiment. The worksite coordinate frame 100 may define a portion of a physical environment in which objects, machines, and perhaps humans may be located. The worksite coordinate frame 100 may take on a three-dimensional form and may be used for various purposes. For instance, the worksite coordinate frame 100 may be defined for a construction site where the construction of a building or another project is being or is about to be carried out. As such, the worksite coordinate frame 100 may include a physical stage or stages on which a physical building process is planned or is occurring within the physical world. However, while various aspects of the disclosure are discussed below in the context of a construction site, example implementations are not limited to construction sites and may extend to a variety of other worksite coordinate frames, such as retail spaces, manufacturing facilities, distribution facilities, office spaces, shopping centers, festival grounds, and/or airports, among other examples.

As depicted in FIG. 1, the worksite coordinate frame 100 includes a plurality of resources. The resources may include one or more actors, devices, hardware components, and/or physical materials. The physical materials may be construction materials 140, which may be any materials or tools located in a construction site. For example, in FIG. 1, the construction materials 140 are depicted as a palette of bricks. Within examples, the actors in the worksite coordinate frame 100 may include robotic actors and human actors. The human actors may have one or more skills. For example, a human actor may be a carpenter. Further, the human actors may interface with the robotic actors and devices using computing devices. Additionally, the worksite 100 may contain a plurality of end effectors and/or an automated end effector changer.

The robotic device 130 may be configured to perform a task within the worksite coordinate frame 100. In the illustrated scenario, the robotic device 130 is a robotic arm to which an end effector can be connected. For example, a tool end effector may be connected to the robotic arm. The tool end effector may be configured to perform a task on a work surface, such as drilling, milling, cutting, welding, nailing, riveting, sanding, spraying, gripping, extruding, etching, carving, or any other task typically performed during construction of a product. Further, the robotic device 130 may include a mount to which different types of end effectors can be attached. As such, the robotic device may swap between different end effectors so that the robotic device 130 can perform different types of tasks with the different end effectors.

The worksite coordinate frame 100 may include a number of markers located at the boundaries of the worksite coordinate frame 100 and/or throughout the worksite coordinate frame 100, and may be used to establish a three-dimensional coordinate system 102 within the worksite coordinate frame 100. For example, the three-dimensional coordinate system 102 may be a Cartesian coordinate system with an x-axis, a y-axis, and a z-axis. One of the markers may be designated as the origin of the coordinate system 102, and the remaining markers may be spaced a known distance from the origin. As a result, each of the markers may be associated with a known (x, y, z) coordinate within the coordinate system 102, where the x-, y-, and z-coordinates correspond to a distance from the origin marker along the x-, y-, and z-axes respectively.

The markers do not necessarily need to be located at the boundaries of the worksite coordinate frame 100, but may alternatively or additionally be arranged at various known locations throughout the worksite coordinate frame 100. For example, in some embodiments, the markers may be arranged in a two-dimensional or three-dimensional grid throughout the worksite. However, other configurations are possible as well, and the markers may be arranged in any manner of known locations in the worksite coordinate frame 100.

In addition to the markers that are arranged throughout the worksite 100, the worksite coordinate frame 100 may include a number of additional markers that may be attached to various target objects throughout the worksite coordinate frame 100. For example, a marker may be attached to the robotic device 130 and/or the construction materials 140. The location of the additional markers may be measured to provide coordinates within the coordinate system 102 associated with the robotic device 130 and/or construction materials 140. For example, a laser sensor in the worksite 100 may direct a laser toward a retroreflective marker attached to the construction material 140. By analyzing the reflected light, the laser tracker may determine the position of the retroreflective marker with respect to the laser tracker. Since the coordinates of the laser tracker within the coordinate system 102 are known, the position of the retroreflective marker with respect to the laser tracker may be used to determine coordinates of the retroreflective marker within the coordinate system 102. As such, by determining coordinates of the retroreflective marker, the location of the construction materials 140 within the worksite coordinate frame 100 may be tracked. Such markers may be attached to any object in the worksite 100.

In some embodiments, determining the location of a target object in the worksite coordinate frame 100 may involve more than simply determining the location of a single point within a three-dimensional coordinate system. For instance, in some embodiments, the locations of a set of points may be determined to define a volume of the target object. For example, referring to FIG. 1, a three-dimensional space representing the volume of the construction materials 140 may be determined.

In other embodiments, determining the location of a target object in the worksite coordinate frame 100 may include determining a pose of the target object relative to the worksite coordinate frame 100. The pose of the target object may include a combination of the position and orientation of the object. Various processes may be used to determine the pose of a target object, including analytic or geometric methods, genetic algorithm methods, and/or learning-based methods, among others.

In embodiments where the target object is a robotic device, the pose of the robot may be determined based on its operational state. The robotic device may have various operational states that result in different poses. A control system may determine the operational state of the robotic device. Given that the volume and/or shape of the robotic device is already known or has otherwise been determined, the control system may determine the pose of the robotic device based on the determined operational state.

For example, referring to FIG. 1, the robotic device 130 may be positioned in any number of poses based on its operational state. One operational state may include configuring the robotic arm to perform a task on a work surface. However, an operational state may include any configuration of a robotic device in the worksite coordinate frame 100 that results in an associated pose. The volume and shape of the various components of the robotic arm are known or have otherwise been determined. Thus, by determining the pose (e.g., the position and orientation) of the robotic arm based on the operational state of the worker robot 130, a three-dimensional volume representing the space occupied by the robotic arm within the worksite coordinate frame 100 may be determined.

Figure 2:
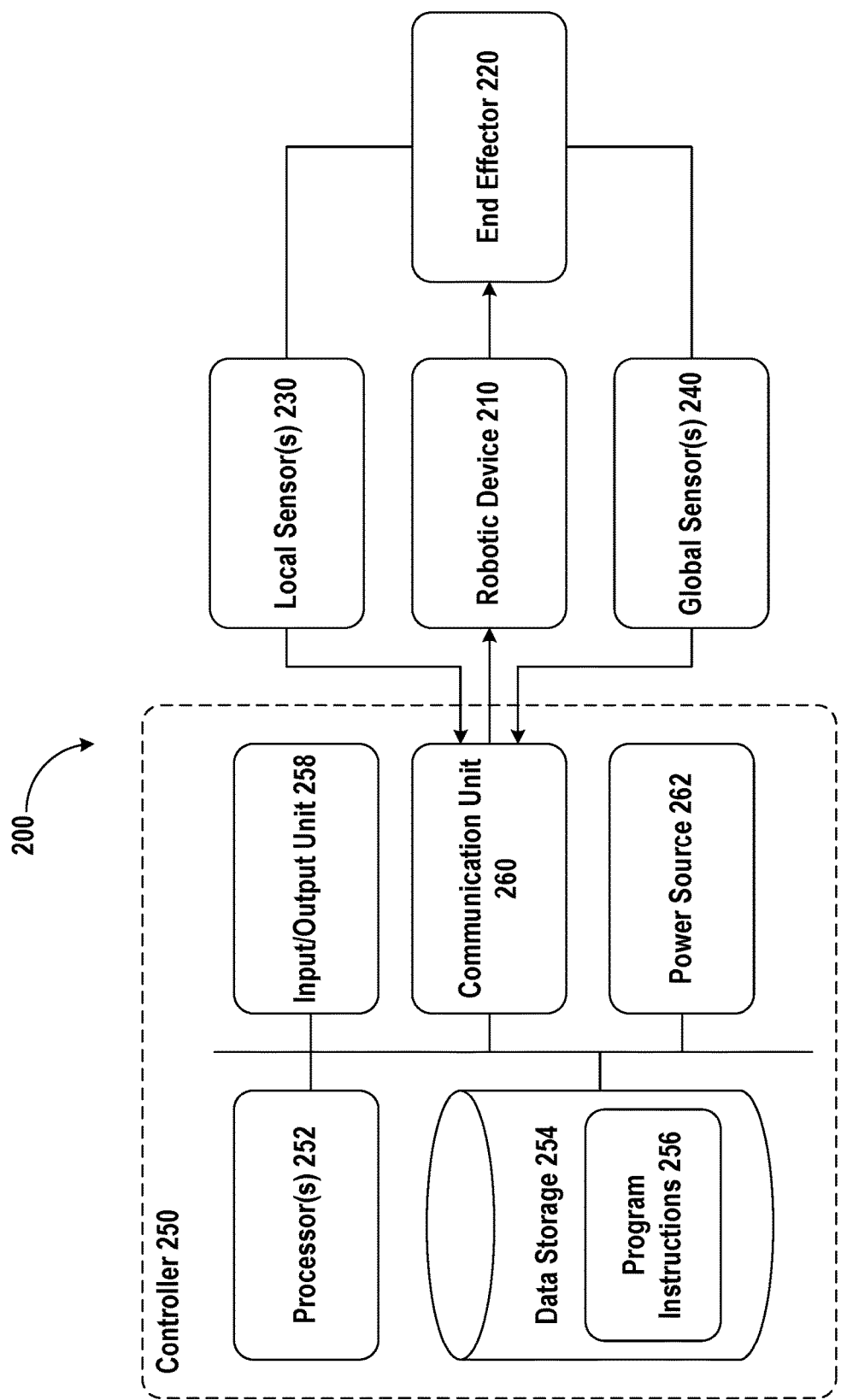
FIG. 2 depicts a block diagram of a control system, according to an example embodiment.

FIG. 2 is a simplified block diagram depicting components of a robotic device control system 200, according to an example embodiment. The device control system 200 may be responsible for coordinating a construction or manufacturing environment. Such a control system may be used to control one or more robotic devices to construct some output product, and may also be used to monitor the environment using one or more sensors.

As illustrated in FIG. 2, the robotic device control system 200 includes a robotic device 210 configured to control an end effector 220. The end effector 220 may be a tool end effector that is configured to perform a task on a work surface and may be mounted to a moveable component, such as a robotic arm, of the robotic device 210. The robotic device 210 may be located within a worksite coordinate frame, such as the worksite coordinate frame 100 depicted in FIG. 1.

The robotic device control system 200 may further include local sensor(s) 230 and global sensor(s) 240 configured to determine the location of various objects in the coordinate frame of a worksite, such as the end effector 220, for example. The local sensor(s) 230 may be arranged on or within the robotic device 210 and may be configured to measure the location of the end effector 220 with respect to a work surface. The global sensor(s) 240, on the other hand, may be arranged within the worksite coordinate frame separate from the robotic device 210 and may be configured to measure the location of the end effector 220 with respect to the worksite coordinate frame.

The local sensor(s) 230 may provide location measurements of the end effector 220 at a higher refresh rate than the global sensor(s) 240, but may not be as accurate due to lower sensor resolution and/or error buildup. For example, the global sensor(s) 240 may include a laser tracker system with very high resolution (e.g., hundredths of a millimeter) and a low refresh rate (e.g., a few hertz. And the local sensor(s) 230 may include a high speed camera for providing optical flow data or an inertial measurement unit (IMU) with a high refresh rate (e.g., 250 Hz for the camera and 1 kHz for the IMU) but lower accuracy due to drift and accumulation of error over time.

The global sensor(s) 240 are not limited to laser tracker systems, but may include any sensor capable of measuring the location of the end effector 220 with respect to the worksite coordinate frame, such as motion capture sensors, light detection and ranging (LIDAR) sensors, point cloud sensors, ultrasonic range sensors, Global Positioning System (GPS) receivers, sonar, optical sensors, Radio Frequency identification (RFID) systems, Near Field Communication (NFC) chips, wireless sensors, radio sensors, radars, cameras (e.g., color cameras, grayscale cameras, and/or infrared cameras), and/or range sensors (e.g., ultrasonic and/or infrared), among others.

Similarly, the local sensor(s) 230 are not limited to high speed cameras or IMUS, but may include any sensor capable of measuring the location of the end effector 220 with respect to a work surface, such as force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chips, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

Additionally, the local sensor(s) 230 and global sensor(s) 240 may be positioned within or in the vicinity of the worksite coordinate frame, among other possible locations. For example, the local sensor(s) 230 may be attached to the robotic device 210. In some embodiments, the global sensor(s) 240 may be arranged in fixed locations throughout the worksite coordinate frame, for example, as a dedicated sensing installation. Further, an example implementation may also use sensors incorporated within existing devices, such as mobile phones, laptops, and/or tablets. These devices may be in possession of people located in the worksite coordinate frame, such as construction workers in a construction site.

FIG. 2 also depicts a controller 250 that may receive data from the local sensor(s) 230 and global sensor(s) 240. In particular, the local sensor(s) 230 and global sensor(s) 240 may provide sensor data to the controller 250 through a communication unit 260. The communication unit 260 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the robotic control system 200 may include access points through which the local sensor(s) 230 and global sensor(s) 240 and/or controller 250 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

The controller 250 is shown to include one or more processor(s) 252, data storage 254, program instructions 256, an input/output unit 258, and a power source 262. Note that the controller 250 is shown for illustration purposes only, as the controller 250 may include additional components and/or have one or more components removed without departing from the scope of the disclosure. Further, note that the various components of the controller 250 may be arranged and connected in any manner. The controller 250 may be incorporated in whole or in part into the robotic device 210 or may take the form of a desktop computer, a laptop, a tablet, a wearable computing device, and/or a mobile phone, among other possibilities.

Each processor, from the one or more processor(s) 252, may be a general-purpose processor or a special purpose processor (e.g., digital signal processors, application specific integrated circuits, etc.). The processor(s) 252 can be configured to execute computer-readable program instructions 256 that are stored in the data storage 254 and are executable to provide the functionality of the controller 250 described herein. For instance, the program instructions 256 may be executable to provide for processing of sensor data received from the local sensor(s) 230 and global sensor(s) 240.

The data storage 254 may include or take the form of one or more computer-readable storage media that can be read or accessed by the processor(s) 252. The one or more computer-readable storage media can include volatile and/or non-volatile storage components, such as optical, magnetic, organic or other memory or disc storage, which can be integrated in whole or in part with the processor(s) 252. In some embodiments, the data storage 254 can be implemented using a single physical device (e.g., one optical, magnetic, organic or other memory or disc storage unit), while in other embodiments, the data storage 254 can be implemented using two or more physical devices. Further, in addition to the computer-readable program instructions 256, the data storage 254 may include additional data such as diagnostic data, among other possibilities. Further, the controller 250 may also include a power source 262 configured to supply power to various components of the controller 250. Any type of power source may be used, such as direct current from a battery or alternating current from mains electricity.

FIG. 2 further depicts the controller 250 including an input/output unit 258. The input/output unit 258 may output information to a user through a display. The display may take on any form and may be arranged to project images and/or graphics to a user of the controller 250. In an example arrangement, a projector within the input/output unit 258 may be configured to project various projections of images and/or graphics onto a surface of the display. The display may include: an opaque or a transparent (or semi-transparent) matrix display, such as an electroluminescent display or a liquid crystal display, one or more waveguides for delivering an image to the user's eyes, or other optical elements capable of delivering an image to the user. A corresponding display driver may be disposed within the controller 250 for driving such a matrix display. Other arrangements may also be possible for the display. As such, the display may show a graphical user interface (GUI) that may provide an application through which the user may interact with the systems disclosed herein.

Additionally, the input/output unit 258 may receive user-input (e.g., from the user of the controller 250). In particular, the input/output unit 258 may allow for interaction with the GUI such as for scrolling, providing text, and/or selecting various features of the application, among other possible interactions. The input/output unit 258 may take on various forms. In one example, the input/output unit 258 may include a pointing device such as a computing mouse used for control of the GUI. However, if the input/output unit 258 includes a touch screen display, touch-input can be received (e.g., such as using a finger or a stylus) that allows for control of the GUI. In another example, the input/output unit 258 may include a keyboard that provides for selection of numbers, characters and/or symbols to be displayed via the GUI. For instance, in the arrangement where the input/output unit 258 includes a touch screen display, portions the display may show the keyboard. Thus, touch-input on the portion of the display including the keyboard may result in user-input such as selection of specific numbers, characters, and/or symbols to be shown on the GUI through the display. In yet another example, the input/output unit 258 may include a voice input device that receives audio input, such as from a user through a microphone, that is then interpretable using one of various speech recognition techniques into one or more characters that may be shown through the display. Other examples may also be possible.

B. Example Jig-Forming Robot Devices

Figure 3A:
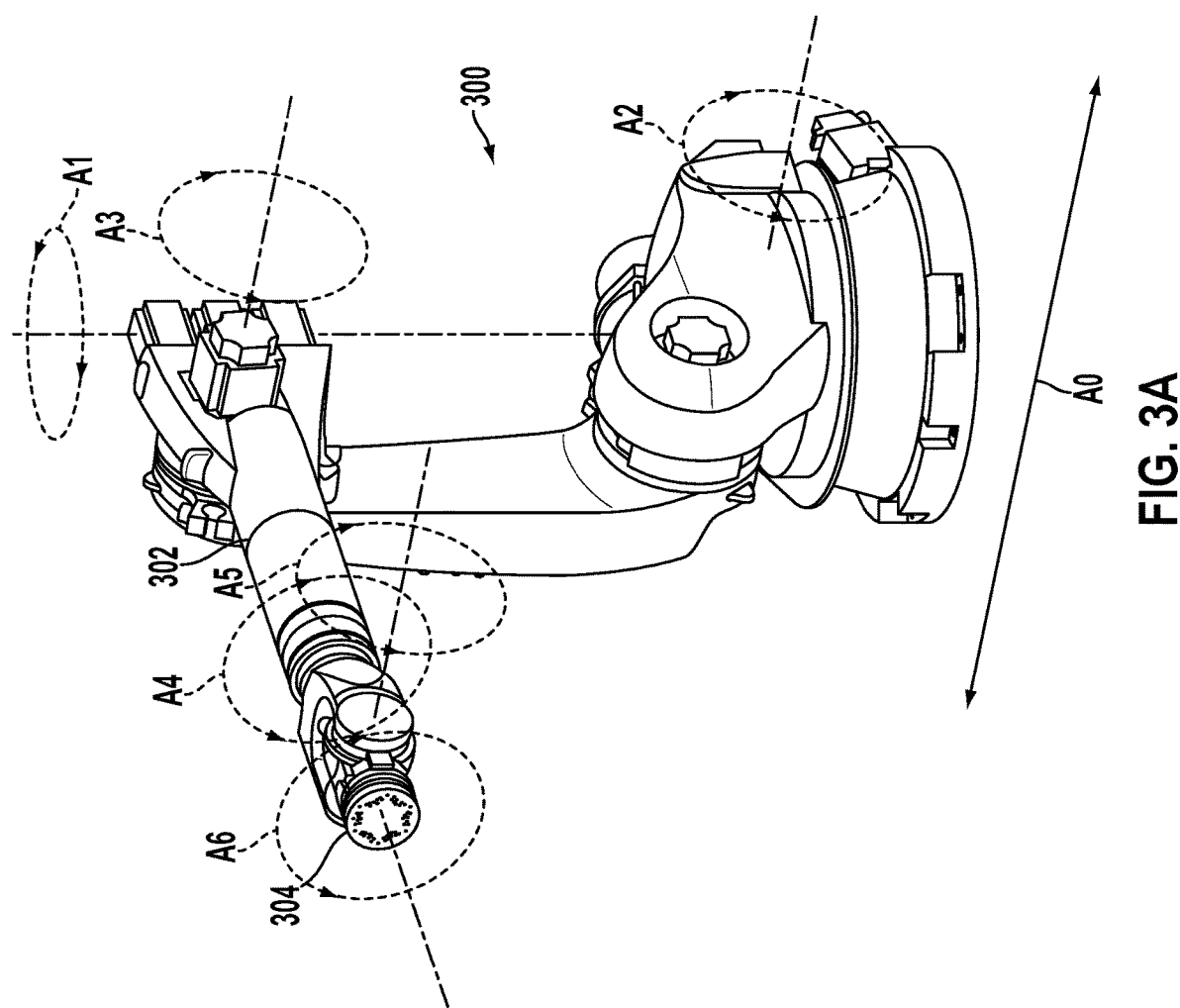
FIG. 3A shows a view of a robot with 7 degrees of freedom, according to an example embodiment.
Figure 3B:
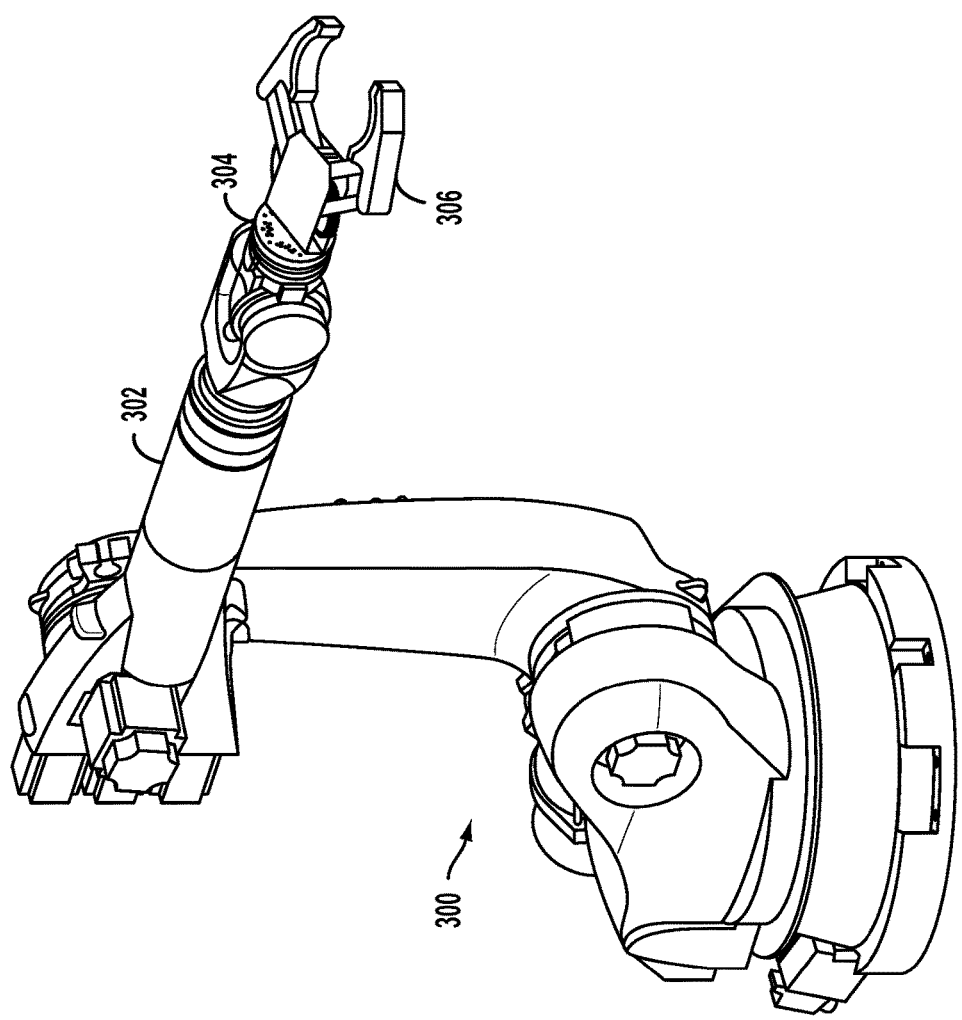
FIG. 3B shows a view of a robot with an attached gripper, according to an example embodiment.
Figure 3C:
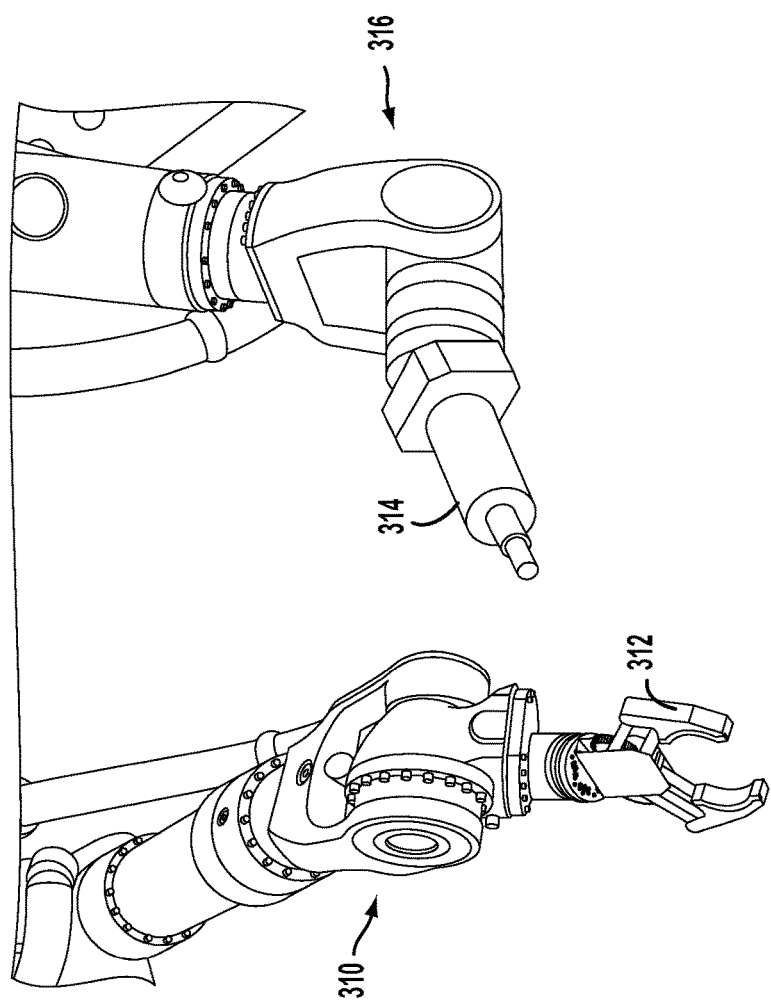
FIG. 3C shows a view of two robots, according to an example embodiment.

Referring now to FIGS. 3A-3C, several non-limiting examples of the robotic device 210 depicted in FIG. 2 will be described. Although these figures focus on the use of robotic arms, other types of device actors may be used in some examples as well or instead.

FIG. 3A illustrates a robotic device, according to an example embodiment. In particular, robotic device 300 may include a robotic arm 302 with an end effector 304 capable of being equipped with one or more different tools, grippers, or guides. The robotic arm 302 may be capable of motion along six degrees of freedom, depicted in FIG. 3A as A1-A6. In certain examples, robotic device 300 may be further capable of motion along one or more axes A0, such as along a rail which is not shown that allows side to side movement. In certain embodiments, instructions may be given to position end effector 304 at a specific location, and the positions of the robotic arm 304 along A1-A6 and/or of robotic device actor 300 along one or more axes A0 may be calculated by a process of the related controller. In alternative embodiments, position control of robotic device 300 and/or robotic arm 302 may require separate, individual settings and control commands. Robotic devices operating with fewer degrees of freedom may be used in some examples as well or instead.

The robotic device 300 may have a fixed end effector or may be able to interchange end effectors. In order to interchange end effectors, the robotic device 300 may have access to a plurality of end effectors that may be stored on or near the robotic device 300. The plurality of end effectors may include end effectors of different types, such as tool end effectors, gripper end effectors, and guide end effectors. As such, the robotic device 300, which has the ability to interchange end effectors, may be assigned different tasks that require different types of end effectors. As explained herein, a robotic device 300 may select an end effector based on a task that is assigned to the robotic device 300.

FIG. 3B illustrates the robotic device actor 300 equipped with a gripper end effector 306. In particular, the gripper end effector 306 may be attached to the robotic arm 302. The gripper end effector 306 may be used for various functions during a building process, such as picking up objects or parts, moving objects or parts, holding objects or parts, and/or placing objects or parts. A variety of different types of grippers may be used, such as a vacuum gripper, a tumble gripper, or a passive centering gripper. Additionally, grippers with different dimensions or other properties may be used, possibly to coincide with different types of robotic devices within a physical worksite.

Examples of tool end effectors that can be coupled to the robotic device 300 include a spindle. A spindle may include a rotating axis for use in various functions within a building process, such as cutting materials, shaping materials, milling or routing. The spindle could be a variety of different types, such as a grinding spindle, an electric spindle, a low-speed spindle, or a high-speed spindle. Additionally, spindles with different dimensions or other properties may be used, depending on the different types of robot devices within a physical worksite. In some examples, other types of tools may be used by robotic devices as well or instead.

FIG. 3C illustrates two robotic devices, according to an exemplary embodiment. The first robotic device 310 is equipped with a gripper end effector 312, and the second robotic device 316 is equipped with a tool end effector 314 (e.g., a spindle). In an embodiment, the two robotic devices may be controlled by the same control system, e.g., control system 200 depicted in FIG. 2. The control system may provide instructions to the robotic devices such that the robotic devices may interact with or manipulate an object or a part. For example, the robotic device 310 may grip a part located in a worksite, and then may position the part such that the robotic device 316 may use the tool end effector 314 to manipulate the part. A worksite, such as the worksite 100 depicted in FIG. 1, may include one or more robotic devices that may be controlled by the same control system, e.g., control system 200 depicted in FIG. 2. Alternatively, each of the one or more robotic devices may be controlled by a respective control system that communicates with the control systems of the other robotic devices in the worksite.

In line with the discussion above, a robotic device may also couple with a guide end effector. A guide end effector may include a shaped part that may serve as a work surface. For example, a guide end effector include a planar part, a sphere part, a parabolic part, a convex part, and/or a concave part. A guide end effector may include other shapes as well. In an embodiment, a robotic device may arrange one or more guide end effectors in 3D space such that the one or more surfaces of the guide end effectors may collectively form a jig.

The jig may serve as a guide for a tool to manipulate one or more parts in a specific manner. The jig may also serve as a work surface against which a tool may manipulate one or more parts. In some examples, the jig may also secure the one or more parts at a specific location and/or in specific orientation such that a tool may manipulate the one or more parts in a specific manner. As explained above, a jig can provide accuracy and repeatability when performing a task (e.g., constructing a product). As such, it may be advantageous to provide a dynamic jig-forming apparatus that can provide workers in a worksite with a jig that can be used by workers to construct a product.

Figure 4:
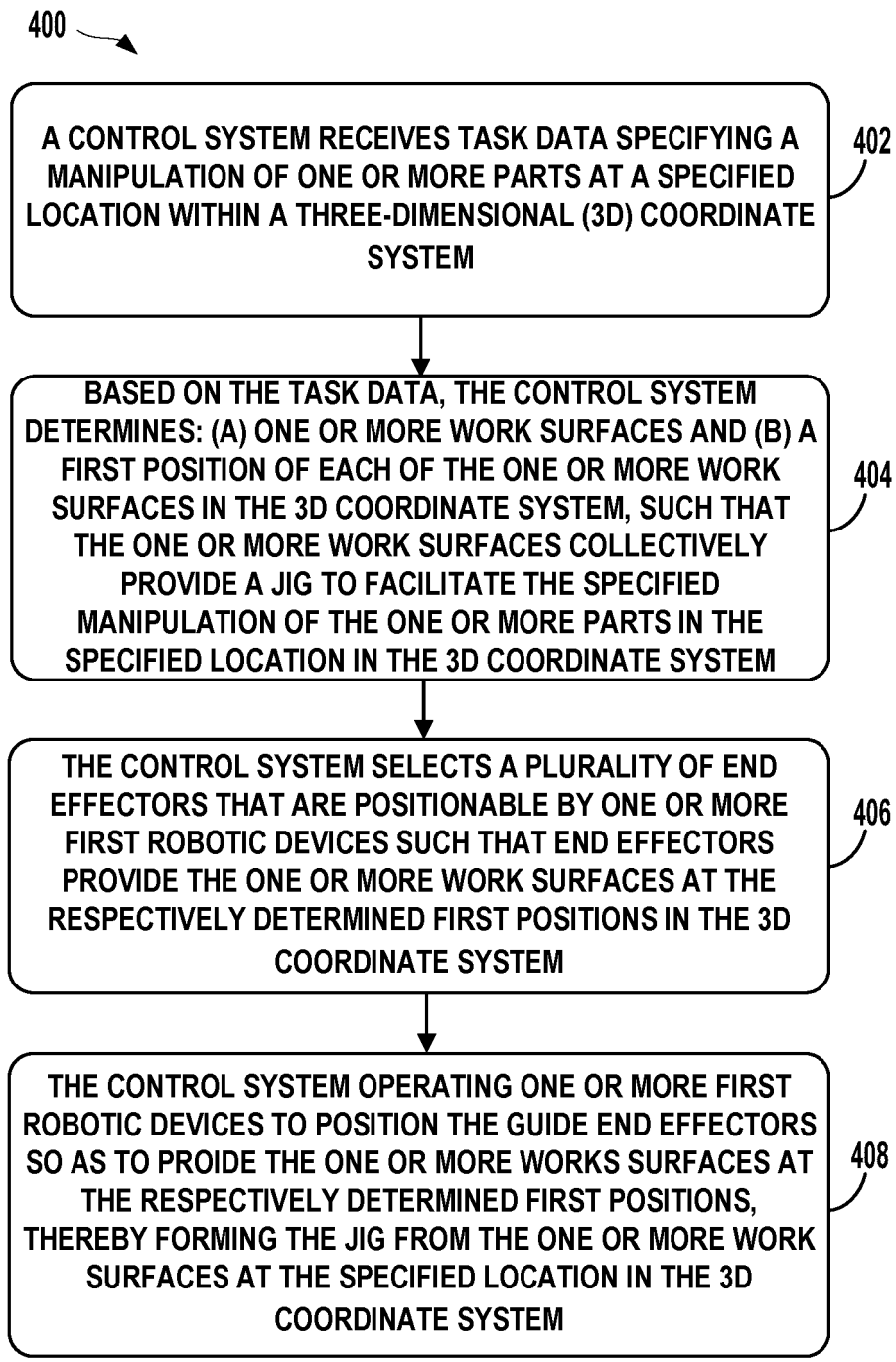
FIG. 4 is a flow diagram of a process, according to an example embodiment.

FIG. 4 illustrates a flowchart showing a method 400 that may be used to provide a dynamic jig in a worksite, according to an example embodiment. Method 400 may be carried out by a control system (e.g., control system 200 in FIG. 2) that includes one or more robotic devices in a worksite. The control system may provide instructions to the one or more robotic devices such that the one or more robotic devices may use guide end effectors to provide the dynamic jig in the worksite. In other examples, the method 400 may be carried out by a controller of a robotic device. The robotic device may be any robotic device, such as the robotic devices illustrated and described previously with respect to FIGS. 1, 3A, 3B, and 3C, amongst other robotic devices.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 4. Where used, program code can be stored on any type of computer-readable medium, for example, such as a storage device including a disk or hard drive.

In addition, each block of the flowchart shown in FIG. 4 may represent circuitry that is wired to perform the specific logical functions in the process. Unless specifically indicated, functions in the flowchart shown in FIG. 4 may be executed out of order from that shown or discussed, including substantially concurrent execution of separately described functions, or even in reverse order in some examples, depending on the functionality involved, so long as the overall functionality of the described method is maintained.

At block 402 of FIG. 4, the control system receives task data specifying a manipulation of one or more parts at a specified location within a 3D coordinate system. The control system may receive the task data from another computing device via a communication unit or may receive the task data directly via user input from an input/output unit of the control system.

In an embodiment, the task data may include a project or product design. The project design may be a two-dimensional (2D) or a 3D computer-aided design (CAD) that defines an end product. Other types of project designs are also possible. For instance, building information modeling (BIM) may be used to design and model a construction project. The project design may define an end product by including design parameters that can be used to construct the product. For instance, the design parameters may include dimensions of the end product and the materials that can be used to construct the product. This may also include specifying the type and quantity of materials and/or any other resources that may be used to construct the end product. The project design may also include information about the location and orientation in the worksite at which the end product may be constructed.

In an embodiment, the project design may also specify one or more construction or manufacturing steps of an incremental process to construct the end product. Each step of the process may be associated with a set of instructions and parameters. For example, for each step, the project design may specify one or more parts (e.g., construction materials) that are used in the step, tools that can be used to manipulate the one or parts in the step, and instructions on how to manipulate the one or more parts using the specified tools to build the portion of the product specified by the task step. Other parameters such as a location at which to perform each step may also be specified. Within examples, the project design may include steps that may be performed by a robotic device and/or a human worker.

In some examples, the task data may specify a number of products to construct. For example, in a manufacturing setting, one or more robotic devices may be assigned to repeatedly perform a task in order to construct or manufacture a plurality of identical products. Accordingly, the control system may use sensor (e.g., global and/or local sensors) and/or other feedback data to track the number of times that a task has been performed.

Returning to FIG. 4, at block 404, the control system, based on the task data, determines: (a) one or more work surfaces and (b) a first position of each of the one or more work surfaces in the 3D coordinate system, such that the one or more work surfaces collectively provide a jig to facilitate the specified manipulation of the one or more parts at the specified location in the 3D coordinate system. In an embodiment, the control system may analyze the task data in order to determine one or more work surfaces that may be used to perform the task and the location at which to place the one or more work surfaces such that a worker may perform the task using the work surfaces. The one or more work surfaces positioned in a particular position may collectively provide a jig.

In an example, the control system may analyze the task data parameters described above (e.g., parts specified for use in a task, tools specified to manipulate the parts, etc.), and may select one or more work surfaces from a library work surfaces based on the analysis of the task data. The library of work surfaces may include a plurality of work surfaces that a robotic device may create using the guide end effectors that are available in the worksite. Further, the work surfaces in the library may be associated with a task type and/or with task parameters. For example, the task data may specify that a task step includes welding a first piece to another piece at a right angle. The control system may determine one or more work surfaces that may be used to secure two pieces together at a right angle such that a worker (e.g., robotic or human) may weld the two pieces together. For example, the control system may select two planar work surfaces positioned perpendicular to one another such that gripper robotic devices can hold the two pieces together at a right angle against the work surfaces. A worker may then weld the two pieces together.

Figure 5:
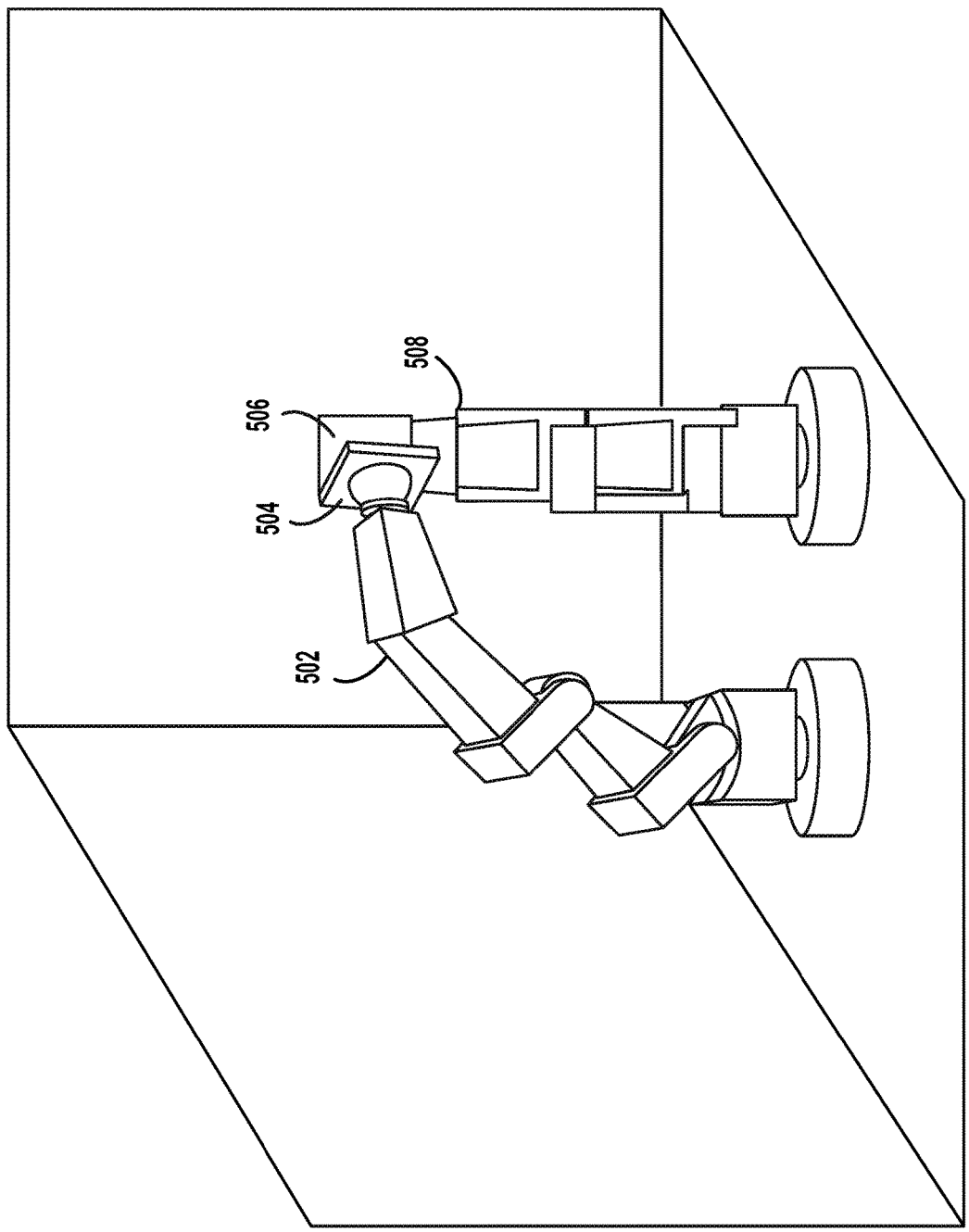
FIG. 5 depicts two robotic arms equipped with planar end effectors, according to an example embodiment.

FIG. 5 illustrates two planar end effectors 504 and 506 that collectively form a jig, according to an exemplary embodiment. As illustrated in FIG. 5, two robotic arms 502, 508 are each coupled to a respective planar guide end effector. The robotic arms 502, 508 may position the planar guide end effectors 504 and 506 in a particular orientation and with a particular angle between the two end effectors. This arrangement provides a jig with two planar work surfaces. Further, the arrangement illustrated in FIG. 5 is one example of a jig configuration that may be included in a jig or work surface library. Other examples of jigs may include jigs that are formed using non-planar end effectors such as a parabolic guide end effector. In some examples, guide end effectors of different shapes may collectively be used to form a jig. It should be noted that any number of guide end effectors may be used to form a jig.

Once the control system determines the one or more work surfaces which comprise the jig, the control system may then determine a first position in the worksite at which to place each of the one or more work surfaces. The respective first position at which to place each of the one or more work surfaces may depend on the design of the end product and/or any spatial restrictions due to existing features or obstacles in the worksite, among other considerations.

In some examples, the control system may not find a jig in the library of jigs that is suitable for use in a particular task. In such a scenario, the control system may further analyze the task data that specify parameters of the task in order to form a jig that may be used to perform the task. For example, the control system may determine a jig configuration to use in a task based on the task parameters such as the design parameters of the product (e.g., dimensions of the product under construction, geometric design of the product, etc.).

Returning to FIG. 4, at block 406, the control system selects, a plurality of guide end effectors that are positionable by one or more first robotic devices such that the end effectors provide the one or more work surfaces at the respectively determined first positions in the 3D coordinate system. The control system may select one or more guide end effectors based on the determined work surfaces or jig, where the selected guide end effectors may positioned to form the determined jig. Selecting one or more guide end effectors may include selecting one or more robotic devices in a worksite to couple to the one or more selected guide end effectors. As explained above, a plurality of end effectors may be located in a worksite in an area that is accessible to the robotic devices. In some examples, a robotic device may autonomously swap between different end effectors. In other examples, an automated end effector changer may swap between end effectors of a robotic device.

Further, at block 408, the control system operates the one or more first robotic devices to position the guide end effectors so as to provide the one or more work surfaces at the respectively determined first positions, thereby forming the jig from the one or more work surfaces at the specified location in the 3D coordinate system. The control system operating the one or more first robotic device may include the control determining robot control data for operating the one or more first robotic devices. The control system may transmit the control data to the one or more robotic devices to which the guide end effectors are coupled.

Further, the steps of the method 400 may also include the control system selecting, from a plurality of end effectors, one or more gripper end effectors to grip and position the one or more parts at the determined second position, and operating, by the control system, one or more second robotic devices to grip position the one or more parts at the determined second position.

Yet further, the steps of the method 400 may include selecting, from a plurality of end effectors, one or more tool end effectors to perform the specified manipulation of the one or more parts, and operating, by the control system, one or more third robotic devices to perform the specified manipulation of the one or more parts using the one or more tool end effectors.

Figure 6:
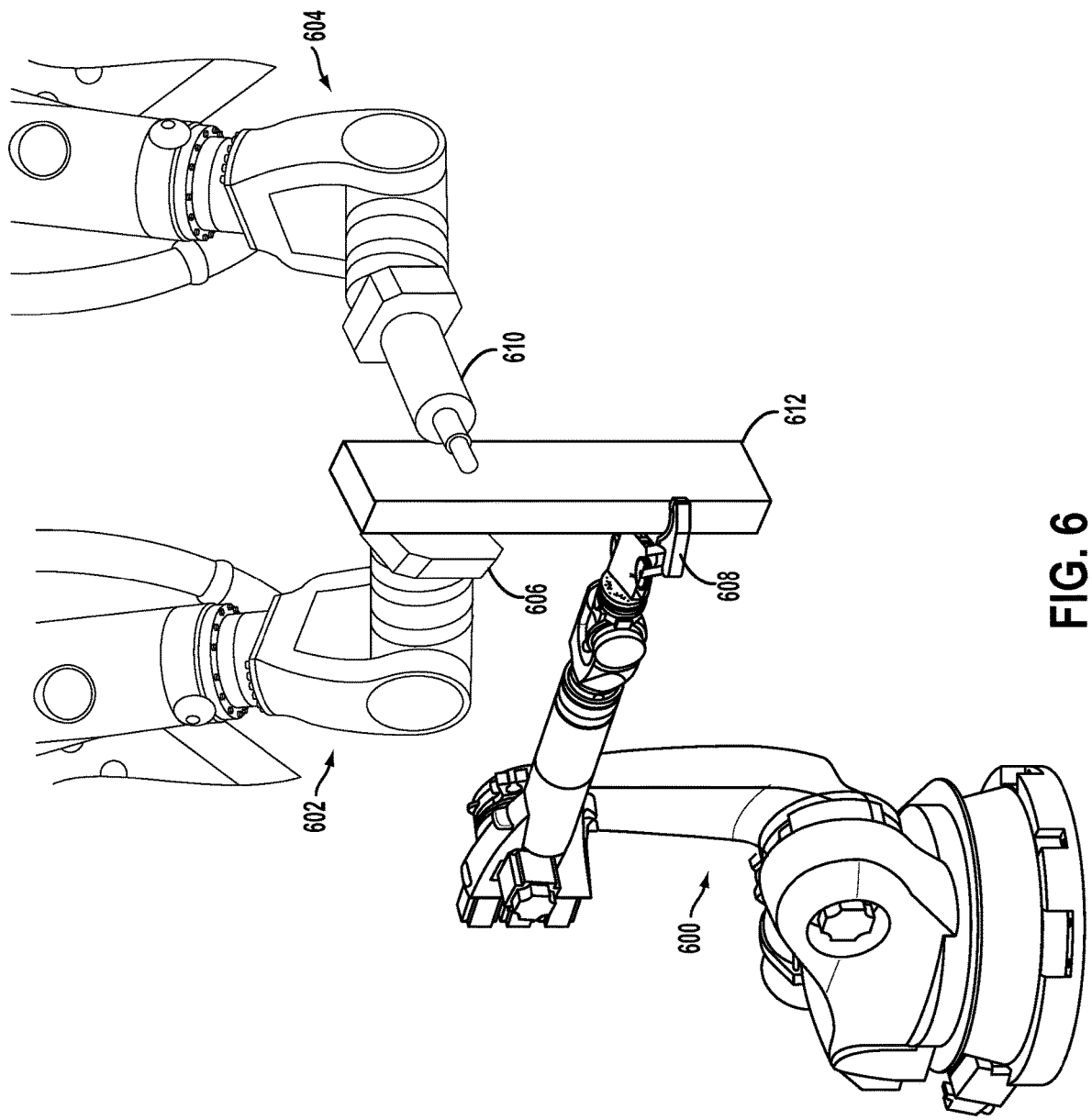
FIG. 6 depicts a plurality of robotic devices performing a task, according to an example embodiment.

FIG. 6 illustrates three robotic devices performing a task, according to an exemplary embodiment. The three robotic devices may be controlled by a global control system. For sake of simplicity, it may be assumed that the control system has received a design and has determined one or more steps of constructing a product specified in the design. Further, it may be assumed that the control system has selected a work surface against which to perform the task step depicted in FIG. 6. The task step depicted in FIG. 6 may be to manipulate a part 612. As illustrated in FIG. 6, the control system selected a planar guide end effector 606 against which to manipulate the part 612. The planar guide end effector 606 may be controlled by a robotic device 602.

To manipulate the part 612 according to the task instructions, the control system may cause the robotic device 602 to position the planar guide end effector 606 at a specified position in 3D space. Further, the control system may cause a robotic device 600 equipped with a gripper end effector 608 to grip the part 612 and position the part 612 as indicated in the task data. As illustrated in FIG. 6, the robotic device may position the part 612 such that the part is held against the work surface 606. Finally, the control system may cause a robotic device 604 to operate a tool end effector 610 to manipulate the part 612. By positioning the part 612 against the work surface 606, the tool 610 may be able manipulate the part 612 to fabricate certain features in the part 612.

As explained above, a task may be deconstructed into a plurality of steps that may be sequentially performed to create a product. In an embodiment, the control system may deconstruct a design into a series of steps that can be performed using one or more work surfaces that are available in a worksite, and that serves as a jig with a planar work surface. Nearly any product design can be broken down into a series of steps that use one or more work surfaces to construct a product. At each step, the control system may reiterate the process of determining a jig (i.e., the work surfaces and the positioning of the surfaces) to be used in the step. Alternatively, the control system may determine the jig to be used for each step before a task is executed. Subsequently, at each step, the control system may reposition and/or reconfigure the jig according to the determined position and/or configuration for that step.

In some examples, the same jig may be moved a plurality of times in the course of one positioning step of positioning one or more parts. For instance, the jig may first be positioned at a side of two parts in order to enable a movement of the two parts that ensures vertical alignment of the two parts. And then the jig might be moved to the top or bottom of the two parts to enable an additional movement that ensures horizontal alignment of the two parts. In other examples, the same jig may be moved a plurality of times in the course of manipulating one or more parts. For instance, a jig may be used to align one or more parts, and then the same jig may be used as work surface against which the one or more parts may be manipulated.

FIG. 7A illustrates a robotic device equipped with a single guide end effector that is used to manipulate one or more parts in order to build a product. As illustrated in FIG. 7A, the guide end effector is a planar guide end effector 704 that is coupled to the robotic device 702 located in a worksite 700, and that serves as a jig with a planar work surface. In this example, the control system may be tasked with building an arch represented by the lines 708 and 710. The solid line 708 represents a portion of the arch that has been constructed, while the dashed line 710 represents a portion of the arch to be constructed. For the sake of simplicity, only the robotic device 702 that provides the planar guide end effector is illustrated. Any parts needed to build the arch may be positioned and manipulated by a robotic and/or human worker.

Figure 7E:
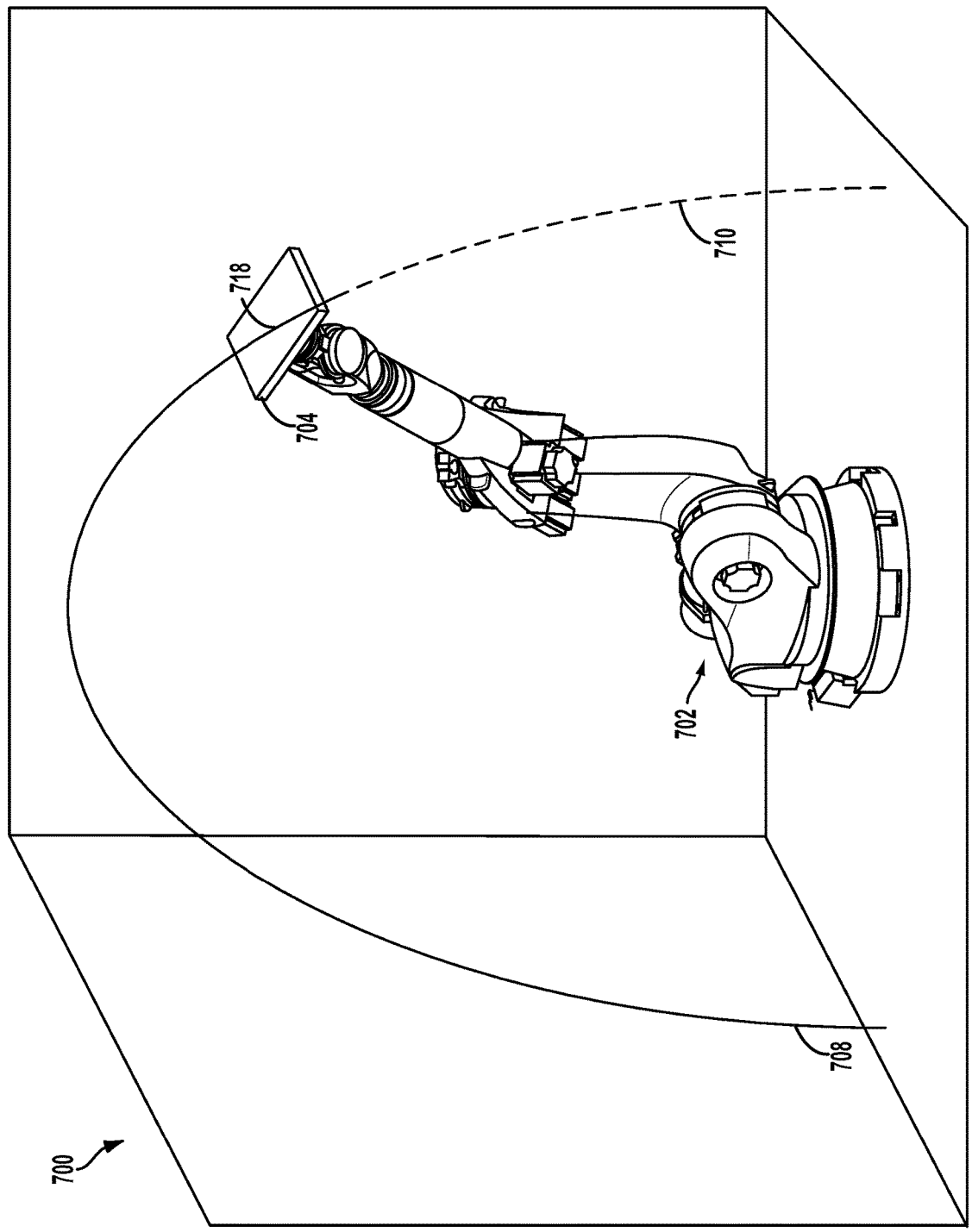

As illustrated in FIG. 7A, the planar guide end effector 704 is planar while the arch that is being constructed is non-planar. In an embodiment, the control system may deconstruct the arc design into a series of steps each of which use a planar guide as a work surface. As such, the planar guide can be used as a planar work surface against which to temporally build a non-planar structure. As illustrated in FIG. 7A, a non-planar surface 706 is being constructed by manipulating parts against the planar work surface provided by the planar guide end effector 704. FIGS. 7B-7E illustrate some of the steps of the incremental construction of the arch 708. In an embodiment, the control system may determine to use a planar guide end effector as work surface against which a worker may construct a non-planar surface. For example, as illustrated, the robotic device may reposition the planar guide end effector 704 such that a worker may construct the non-planar surface (e.g., non-planar surfaces 712, 714, 716, and 718) against the planar work surface provided by the planar guide end effector 704. FIGS. 7A-7E illustrate five incremental steps of many steps to build the arch. Other structures may require a smaller number or greater number of incremental steps to build a structure.

In an embodiment, a work surface may be used by a gripper robotic device as a registration point in order to precisely determine the positioning of a part that is gripped by the gripper of the robotic device. Since a gripper robotic device can accurately determine the positioning of the part relative to the work surface, the control system surface may then precisely position the part at a location at which the part is to be manipulated. The control system may cause the robotic device to position the gripped part at the determined location.

Figure 8:
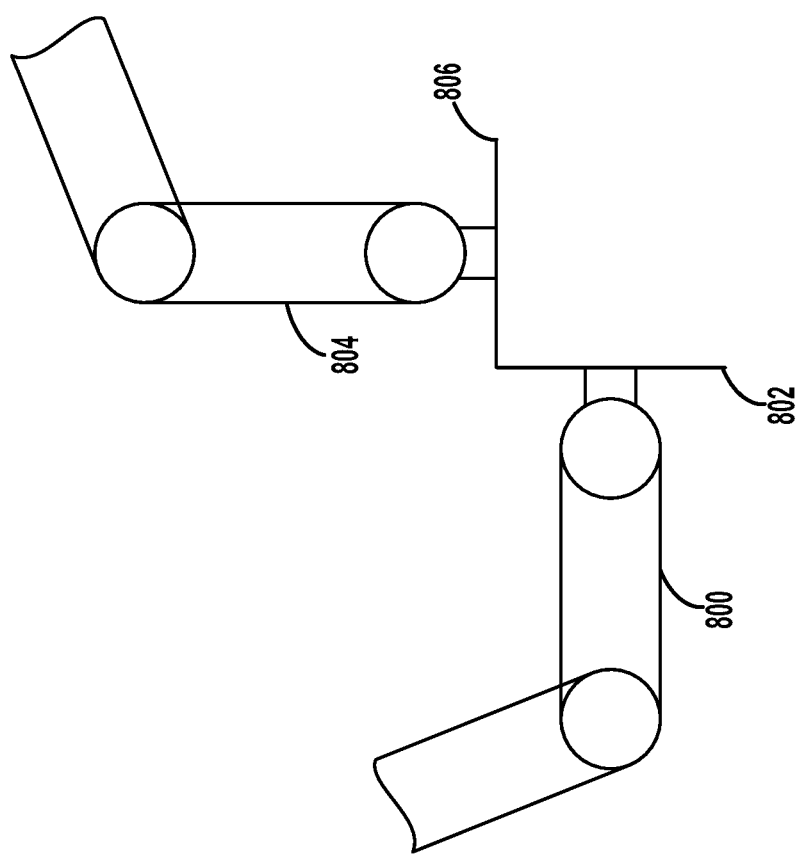
FIG. 8 depicts a top of view of two robotic devices equipped with planar end effectors, according to an example embodiment.

FIG. 8 illustrates a top view of two planar work surfaces positioned perpendicularly to each other, according to an exemplary embodiment. In an example, the two planar work surfaces may serve as a registration point for robotic devices that are gripping parts to be manipulated. This arrangement may be useful, for example, when a task step includes joining (e.g., gluing, welding, coupling via joints, etc.) two or more parts together.

Figure 9A:
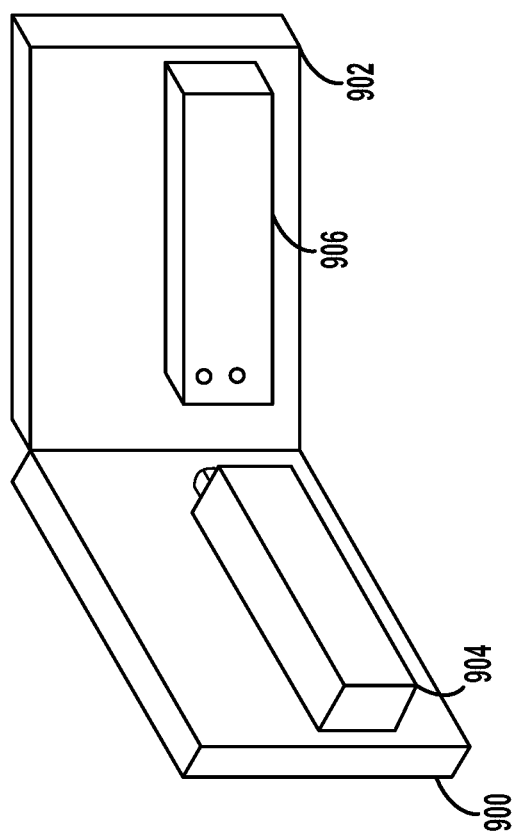
FIG. 9A depicts two parts, each positioned against a respective planar work surface, according to an example embodiment.

FIG. 9A illustrates two parts, each held against a planar work surface, according to an exemplary embodiment. For the sake of simplicity, robotic devices are not depicted in FIG. 9A, but it may be assumed that each of the planar work surfaces 900, 902 is positioned in a worksite by a respective robotic device. It may further be assumed that each of the parts 904, 906 is gripped by a respective robotic device. As illustrated in FIG. 9A, the parts 904, 906 include complementary features that allow the parts 904, 906 to be joined (e.g., to form a butt joint). For example, the part 906 includes two pin holes, and the part 904 may include two pins that fit into the pin holes of the part 906.

A control system may determine one or more geometric alignment requirements in order to join the two parts together. The geometric alignments may indicate a positioning of the parts relative to one another such that the parts can be moved towards each other in a motion that causes the two parts to meet and interlock. The control system may then cause the robotic devices gripping the parts to position the parts 904, 906 such that they are geometrically aligned according to the determined requirements. As the control system knows the precise positioning of the work surfaces in the worksite, the control system may determine the precise location and orientation of the parts by placing the parts against the work surfaces. Once the parts are geometrically aligned, the gripper robotic devices may move the parts towards each other such that the parts meet and the complementary features interlock.

Figure 9B:
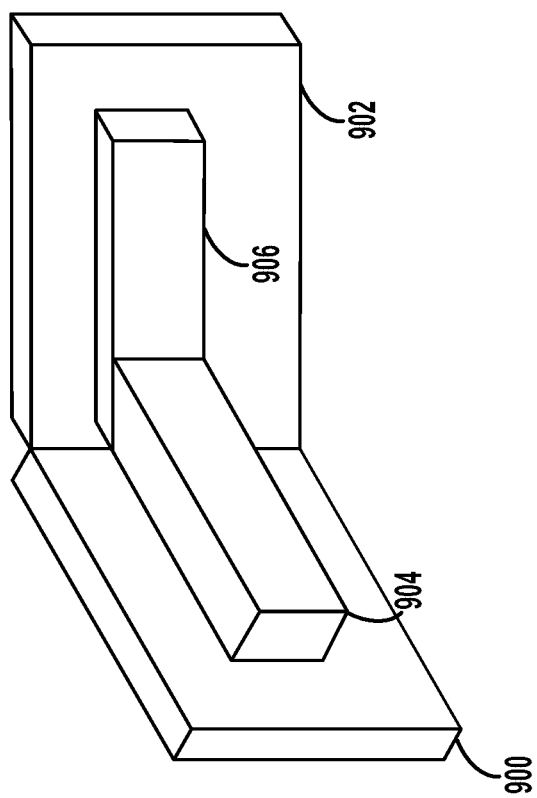
FIG. 9B depicts the two parts coupled, according to an example embodiment.

FIG. 9B illustrates the two parts 904, 906 coupled to one another. As illustrated in FIG. 9B, the two parts may form a butt joint. In some examples, the parts to be joined may not have complementary features that allow the features to interlock. In such examples, the control system may cause the gripper robotic devices to align the parts such that a robotic device equipped with a tool end effector may manipulate the parts to join the parts. For example, the tool robotic device may weld, nail, screw, and/or glue the two parts together. Note that the parts that are combined may have any shape (e.g., cylindrical).

In an embodiment, a part may be aligned against a jig using force controlled alignment. In force controlled alignment, the control system may use data from one or more force sensors in order to align the more than one part against the jig. In particular, the force sensors may provide the control system with force data indicative of force that is being applied to the jig. For example, a robotic device that is positioning a part against a jig may include a force sensor that provides the control system with sensor data. Based on the data, the control system may be able to determine that the part is positioned against the jig. The control system may also be able to determine the positioning, with respect to the jig, of the one or more parts held against the jig.

As the control system may determine, based on the force sensor data, that a particular part is being held against the jig, the control system may then provide instructions to the robotic device holding the part to position the part in a particular orientation. In an example, the control system may position the part at in particular orientation in order to manipulate the part against the jig in a particular manner. In another example, the control system may use data from force sensors to determine that more than one part is being held against the jig. Once the control system determines that the more than one part are being held against the jig, the control system may then operate the robotic devices holding the more than one part to align the parts in a particular orientation. The control system may then provide instructions to workers to join the aligned parts or manipulate the aligned parts in a particular manner.

The example jigs provided in FIGS. 5, 6, 7A-7D, and 8 and the accompanying description herein is for illustrative purposes only and should not be considered limiting. In an implementation, a jig may be formed from one or more work surfaces where at least one of the work surfaces is not an end effector guide that is coupled to a robotic device. For example, one or more work surfaces may be positioned in an environment by a worker. The work surface may may be able to stand unaided in the environment, such as a work surface that has a mechanical support mechanism. Additionally and/or alternatively, a worker may attach the work surface may be attached to another work surface or other surface in the environment using an attachment mechanism. Such a work surface may be positioned in the environment without a robotic device holding the work surface in place. In an embodiment, a worksite may include end effectors guides and guides that can be positioned unaided in the environment. The control system may then use one or more end effector guides and/or one or more unaided guides to form a jig. Note that although the unaided guides may be positioned in the environment without being held by a robotic device, a worker robotic may place the unaided guide in a determined position in the environment.

C. Example Robotic Device

Figure 10:
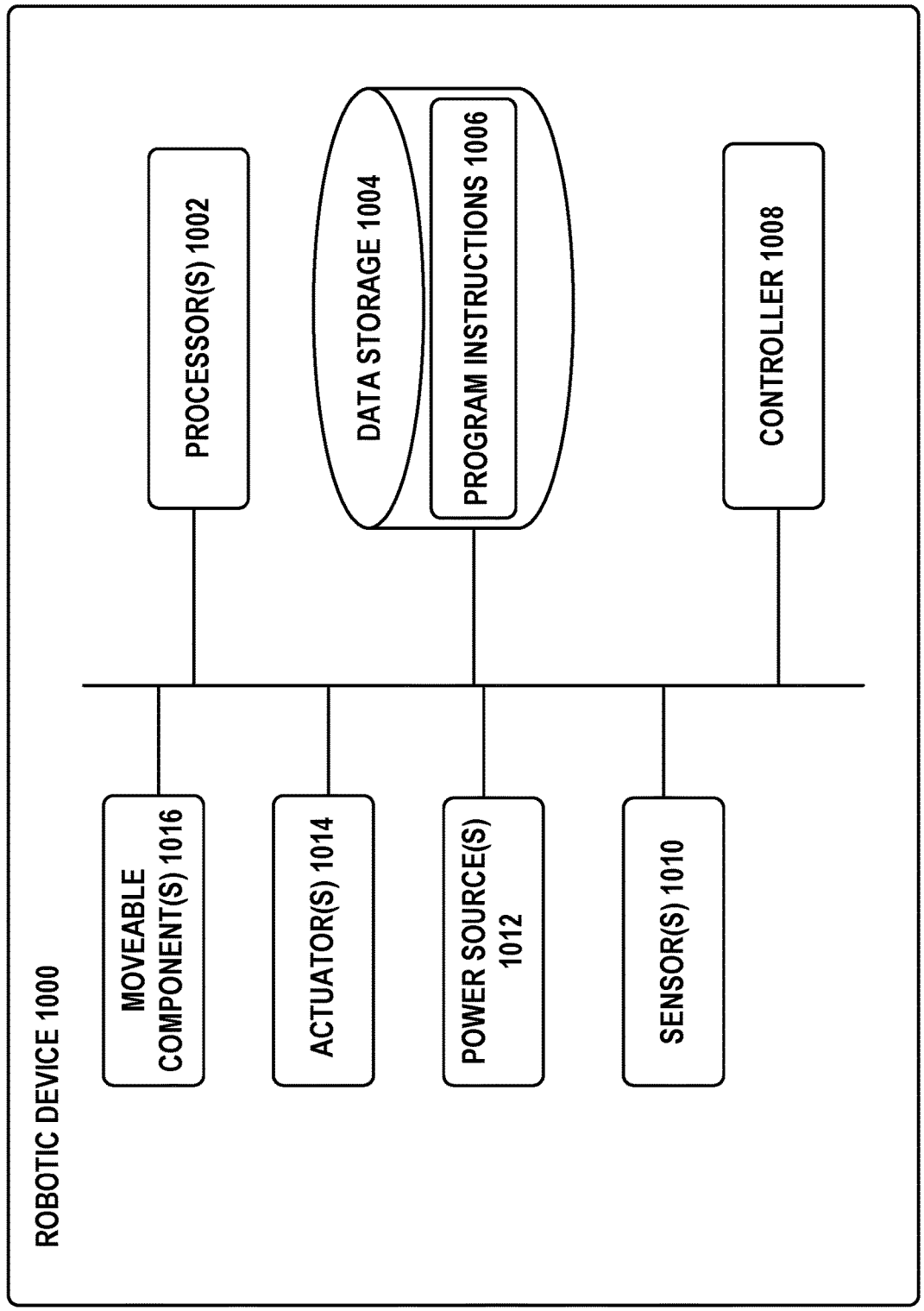
FIG. 10 is a simplified block diagram depicting components of a robotic device, according to an example embodiment.

FIG. 10 shows an example configuration of a robotic device 1000. Generally, a robotic device 1000 may be any device that has a computing ability and interacts with its surroundings with an actuation capability and/or with ability to emit/generate physical phenomena such as light and/or sound, among others. For instance, the robotic device 1000 may be a humanoid robot, a robotic arm, or a quadruped robot, among others. A robotic device may also be any device that is generally understood to those of ordinary skill in the art as being a "robotic." The robotic device 1000 may also be referred to as a robotic device, a robotic manipulator, a robot client, or a robot, among others.

The robotic device 1000 is shown to include processor(s) 1002, data storage 1004, program instructions 1006, controller 1008, sensor(s) 1010, power source(s) 1012, actuator(s) 1014, and movable component(s) 1016. Note that the robotic device 1000 is shown for illustration purposes only and robotic device 1000 may include additional components and/or have one or more components removed without departing from the scope of the disclosure. Further, note that the various components of robotic device 1000 may be arranged and connected in any manner.

Moreover, the above description of processor(s) 252, data storage 254, program instructions 256, sensors (e.g., local sensor(s) 2100 and global sensor(s) 240), and/or power source 262, may apply to any discussion below relating to the respective component being used in another system or arrangements. For instance, as noted, FIG. 10 (among other possible figures) illustrates processors, data storage, program instructions, sensors, and/or power as being incorporated in another arrangement. These components at issue may thus take on the same or similar characteristics (and/or form) as the respective components discussed above in association with FIG. 2. However, the components at issue could also take on other characteristics (and/or form) without departing from the scope of the disclosure.

As noted, the robotic device 1000 may include a controller 1008 (e.g., taking the form of a microcontroller). The controller 1008 may include processing unit and data storage, and may be arranged to manage or carry out various operations (e.g., individually or in collaboration with processor(s) 1002). Thus, this controller 1008 could take on the same or similar characteristics (and/or form) as the above-mentioned controller 250, but could take on other characteristics (and/or form) as well. So in some implementations, the controller 250 may be incorporated as part the robotic device 1000 and thus controller 250 may itself be controller 1008. In other implementation, controller 1008 may be included as part of the robotic device 1000 and controller 250 may be separate from the robotic device 1000. Regardless of the implementations, these controllers may take various forms. For instance, a controller may take the form of a chip set, a server system, a digital signal processor, a programmable logic controller, and/or a sampled-data system, among other possibilities. Moreover, a controller could also be referred to herein as a control system, among other.

Additionally, the robotic device 1000 may also include one or more actuator(s) 1014. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 1014 may cause movement of various movable component(s) 1016 of the robotic device 1000. The moveable component(s) 1016 may include appendages/members such as robotic arms, legs, and/or hands, among others. The moveable component(s) 1016 may also include a movable base, wheels, and/or end effectors, among others. Further, when a robotic device 1000 includes at least one end effector, such an end effector may be a tool (e.g., a screwdriver, drill, welding iron, or some combination thereof) and/or a gripper, among others as discussed above.

D. Example Computing Device

Figure 11:
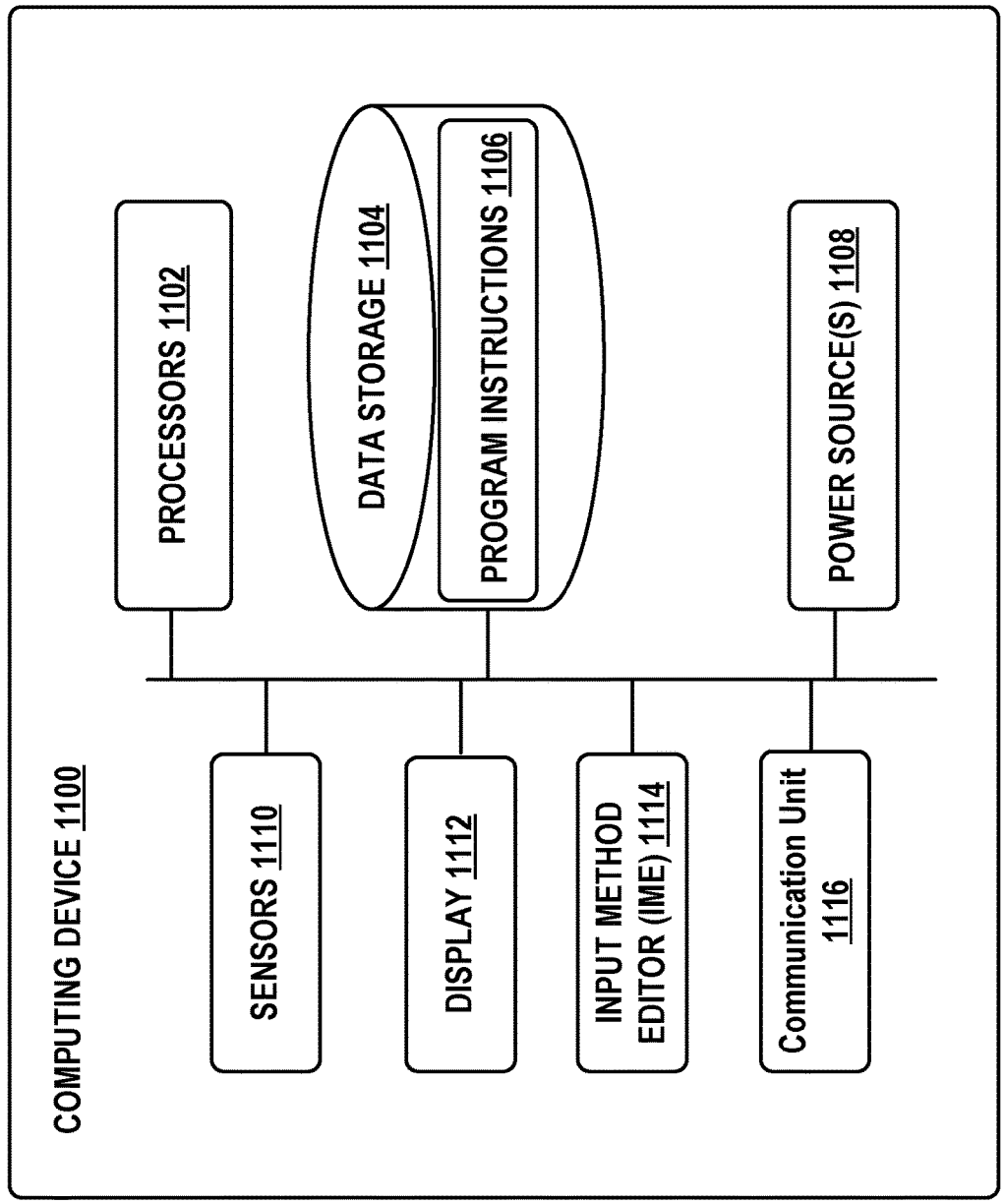
FIG. 11 is a simplified block diagram depicting components of a computing device, according to an example embodiment.

FIG. 11 is a block diagram showing components of an example computing device 1100 that includes one or more processors 1102, data storage 1104, program instructions 1106, power source(s) 1108, sensors 1110, display 1112, and Input Method Editor (IME) 1114. Note that the computing device 1100 is shown for illustration purposes only and computing device 1100 may include additional components and/or have one or more components removed without departing from the scope of the disclosure. Further, note that the various components of computing device 1100 may be arranged and connected in any manner.

Display 1112 may take on any form (e.g., LED, LCD, OLED, etc.). Further, display 1112 may be a touchscreen display (e.g., a touchscreen display on a tablet). Display 1112 may show a graphical user interface (GUI) that may provide an application through which the user may interact with the systems disclosed herein.

Further, the computing device 1100 may receive user input (e.g., from the user of the computing device 1100) via IME 1114. In particular, the IME 1114 may allow for interaction with the GUI such as for scrolling, providing text, and/or selecting various features of the application, among other possible interactions. The IME 1114 may take on various forms. In one example, the IME 1114 may be a pointing device such as a computing mouse used for control of the GUI. However, if display 1112 is a touch screen display, user touch input can be received (e.g., such as using a finger or a stylus) that allows for control of the GUI. In another example, IME 1114 may be a text IME such as a keyboard that provides for selection of numbers, characters and/or symbols to be displayed via the GUI. For instance, in the arrangement where display 1112 is a touch screen display, portions of the display 1112 may show the IME 1114. Thus, touch-input on the portion of the display 1112 including the IME 1114 may result in user-input such as selection of specific numbers, characters, and/or symbols to be shown on the GUI via display 1112. In yet another example, the IME 1114 may be a voice IME that may be used that receives audio input, such as from a user via a microphone of the computing device 1100, that is then interpretable using one of various speech recognition techniques into one or more characters than may be shown via display 1112. Other examples may also be possible.

In an embodiment, an interactive control interface may be displayed on the display 1112 of the computing device. The interactive control interface may display a 3D model of an assembly that is being built or worked on in the worksite. Further, the interactive control interface may include a control panel for controlling one or more robotic devices in the worksite. In an embodiment, the user may provide an input via the interface to the control system of the robotic devices. In an example, the input may be an instruction to form a particular jig in a particular area in the worksite. In such an example, the user may select the jig from a library of predetermined jigs that may available to the user. In another example, the use may select a feature on the 3D model that the want to align, and the one or more robotic devices may form a jig such that a worker may use the jig to align the feature. In yet another example, the user input may be indicative of a new jig design that may include one or more of the guides available in the worksite.

The computing device 1100 may also include a communication unit 1116. The communication unit 1116 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

A computing device 1100 may take on various forms. For instance, the computing device 1100 may take the form of a desktop computer, a laptop, a tablet, a wearable computing device, and/or a mobile phone, among other possibilities.

The computing device 1100 may be coupled with one or more sensors such as optical flow sensors, force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chip, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A computer-implemented method comprising:
   receiving, by a controller that is associated with one or more robotic devices, task data for constructing an end product using one or more parts, the task data specifying a manipulation of the one or more parts that is to occur within a worksite;
   identifying, by the controller and based on the task data, a dynamically formable jig for facilitating the specified manipulation of the one or more parts that is to occur within the worksite; and
   dynamically forming, by the controller, the identified jig for facilitating the specified manipulation of the one or more parts that is to occur within the worksite, comprising:
      identifying one or more work surfaces that (a) the one or more robotic devices are capable of creating using guide end effectors that are available to the one or more robotic devices at the worksite, and (b) are associated with the identified, dynamically formable jig,
      selecting a particular set of the guide end effectors that (a) are available to the one or more robotic devices at the worksite, and (b) are usable to create the identified, one or more work surfaces, and
      operating the one or more robotic devices to position the particular set of the guide end effectors to dynamically form the identified jig.

2. The method of claim 1, wherein the selected set of guide end effectors comprises two or more of a gripper guide end effector, a tool guide end effector, and a planar guide end effector.

3. The method of claim 1,
   wherein identifying the dynamically formable jig comprises identifying a particular angle associated with the specified manipulation, and
   wherein operating the particular set of the guide end effectors comprises positioning the particular set of guide end effectors at the particular angle with respect to each other.

4. The method of claim 1, comprising, after the manipulation of the one or more parts has occurred, dynamically de-forming the identified jig.

5. The method of claim 1, wherein the dynamically formable jig is identified from among a library of dynamically formable jigs that are indicated as suitable for performing the specified manipulation.

6. The method of claim 1,
   wherein the specified manipulation comprises a first manipulation in a first position and a second manipulation in a second position, and
   wherein operating the one or more robotic devices comprises positioning the particular set of the guide end effectors to dynamically form the identified jig in the first position, then positioning the particular set of the guide end effectors to dynamically form the identified jig in the second position.

7. The method of claim 1, wherein the manipulation comprises a task that is for completion by a human worker.

8. A system comprising one or more computers and one or more storage devices storing instructions that are operable, when executed by the one or more computers, to cause the one or more computers to perform operations comprising:
   receiving, by a controller that is associated with one or more robotic devices, task data for constructing an end product using one or more parts, the task data specifying a manipulation of the one or more parts that is to occur within a worksite;
   identifying, by the controller and based on the task data, a dynamically formable jig for facilitating the specified manipulation of the one or more parts that is to occur within the worksite; and
   dynamically forming, by the controller, the identified jig for facilitating the specified manipulation of the one or more parts that is to occur within the worksite, comprising:
      identifying one or more work surfaces that (a) the one or more robotic devices are capable of creating using guide end effectors that are available to the one or more robotic devices at the worksite, and (b) are associated with the identified, dynamically formable jig,
      selecting a particular set of the guide end effectors that (a) are available to the one or more robotic devices at the worksite, and (b) are usable to create the identified, one or more work surfaces, and
      operating the one or more robotic devices to position the particular set of the guide end effectors to dynamically form the identified jig.

9. The system of claim 8, wherein the selected set of guide end effectors comprises two or more of a gripper guide end effector, a tool guide end effector, and a planar guide end effector.

10. The system of claim 8,
   wherein identifying the dynamically formable jig comprises identifying a particular angle associated with the specified manipulation, and wherein operating the particular set of the guide end effectors comprises positioning the particular set of guide end effectors at the particular angle with respect to each other.

11. The system of claim 8, wherein the operations comprise, after the manipulation of the one or more parts has occurred, dynamically de-forming the identified jig.

12. The system of claim 8, wherein the dynamically formable jig is identified from among a library of dynamically formable jigs that are indicated as suitable for performing the specified manipulation.

13. The system of claim 8,
wherein the specified manipulation comprises a first manipulation in a first position and a second manipulation in a second position, and
wherein operating the one or more robotic devices comprises positioning the particular set of the guide end effectors to dynamically form the identified jig in the first position, then positioning the particular set of the guide end effectors to dynamically form the identified jig in the second position.

14. The system of claim 8, wherein the manipulation comprises a task that is for completion by a human worker.

15. A non-transitory computer-readable storage medium comprising instructions that are executable by one or more computers and that, upon execution, cause the one or more computers to perform operations comprising:
receiving, by a controller that is associated with one or more robotic devices, task data for constructing an end product using one or more parts, the task data specifying a manipulation of the one or more parts that is to occur within a worksite;
identifying, by the controller and based on the task data, a dynamically formable jig for facilitating the specified manipulation of the one or more parts that is to occur within the worksite; and
dynamically forming, by the controller, the identified jig for facilitating the specified manipulation of the one or more parts that is to occur within the worksite, comprising:
identifying one or more work surfaces that (a) the one or more robotic devices are capable of creating using guide end effectors that are available to the one or more robotic devices at the worksite, and (b) are associated with the identified, dynamically formable jig,
selecting a particular set of the guide end effectors that (a) are available to the one or more robotic devices at the worksite, and (b) are usable to create the identified, one or more work surfaces, and
operating the one or more robotic devices to position the particular set of the guide end effectors to dynamically form the identified jig.

16. The medium of claim 15, wherein the selected set of guide end effectors comprises two or more of a gripper guide end effector, a tool guide end effector, and a planar guide end effector.

17. The medium of claim 15,
wherein identifying the dynamically formable jig comprises identifying a particular angle associated with the specified manipulation, and
wherein operating the particular set of the guide end effectors comprises positioning the particular set of guide end effectors at the particular angle with respect to each other.

18. The medium of claim 15, wherein the operations comprise, after the manipulation of the one or more parts has occurred, dynamically de-forming the identified jig.

19. The medium of claim 15, wherein the dynamically formable jig is identified from among a library of dynamically formable jigs that are indicated as suitable for performing the specified manipulation.

20. The medium of claim 15,
wherein the specified manipulation comprises a first manipulation in a first position and a second manipulation in a second position, and
wherein operating the one or more robotic devices comprises positioning the particular set of the guide end effectors to dynamically form the identified jig in the first position, then positioning the particular set of the guide end effectors to dynamically form the identified jig in the second position.

\* \* \* \* \*